(12) United States Patent
Jalan et al.

(10) Patent No.: US 12,206,945 B2
(45) Date of Patent: Jan. 21, 2025

(54) GENERATION OF RECOMMENDATIONS USING TRUST-BASED EMBEDDINGS

(71) Applicant: SONY GROUP CORPORATION, Tokyo (JP)

(72) Inventors: Raksha Jalan, Bengaluru (IN); Prosenjit Biswas, Bengaluru (IN); Brijraj Singh, Bengaluru (IN)

(73) Assignee: SONY GROUP CORPORATION, Tokyo (JP)

(*) Notice: Subject to any disclaimer, the term of this patent is extended or adjusted under 35 U.S.C. 154(b) by 15 days.

(21) Appl. No.: 18/187,210

(22) Filed: Mar. 21, 2023

(65) Prior Publication Data
US 2023/0319358 A1 Oct. 5, 2023

Related U.S. Application Data

(60) Provisional application No. 63/362,218, filed on Mar. 31, 2022.

(51) Int. Cl.
*H04N 21/466* (2011.01)

(52) U.S. Cl.
CPC ..... *H04N 21/4668* (2013.01); *H04N 21/4666* (2013.01)

(58) Field of Classification Search
CPC .............. H04N 21/4668; H04N 21/4666
See application file for complete search history.

(56) References Cited

U.S. PATENT DOCUMENTS

| 2019/0090021 A1* | 3/2019 | Walker ................. H04N 21/252 |
| 2020/0112755 A1* | 4/2020 | Seshadri .......... H04N 21/25891 |
| 2021/0248461 A1 | 8/2021 | Cheng |
| 2023/0022396 A1* | 1/2023 | Mitra ................ G06Q 30/0631 |

FOREIGN PATENT DOCUMENTS

| CN | 109408734 B | 7/2021 |
| CN | 114154902 A | 3/2022 |

OTHER PUBLICATIONS

Singh, et al., "Trust and Distrust based Cross-domain Recommender System", Applied Artificial Intelligence, An International Journal, vol. 35, Issue 4, Feb. 12, 2021, 326-351 pages.

* cited by examiner

*Primary Examiner* — Randy A Flynn
(74) *Attorney, Agent, or Firm* — CHIP LAW GROUP

(57) ABSTRACT

An electronic device for generation of recommendations using trust-based embeddings is provided. The electronic device determines first correlation information of a first set of users associated with a first domain. The electronic device generates, based on the first correlation information, a first vector indicating a trust embedding of a first user with respect to the first set of users, in the first domain. The electronic device receives second correlation information associated with a second set of users associated with a second domain. The electronic device utilizes a Graph Attention Network model for the second correlation information to generate a second vector indicative of a trust embedding of the first user, with respect to the second set of users, in the second domain. The electronic device applies a recommendation model on the first vector and the second vector to recommend one or more items to the first user.

16 Claims, 9 Drawing Sheets

GENERATION OF RECOMMENDATIONS USING TRUST-BASED EMBEDDINGS

CROSS-REFERENCE TO RELATED APPLICATIONS/INCORPORATION BY REFERENCE

This Application also makes reference to U.S. Provisional Application Ser. No. 63/362,218, which was filed on Mar. 31, 2022. The above stated Patent Applications are hereby incorporated herein by reference in their entirety.

FIELD

Various embodiments of the disclosure relate to recommendation systems. More specifically, various embodiments of the disclosure relate to an electronic device and a method for generation of recommendations using trust-based embeddings.

BACKGROUND

Advancements in the field of recommendation systems have led to development of different types of recommendation models that have capability to provide personalized recommendations to users. The recommendation models may be deployed on application servers or personal devices of users, based on a size of the recommendation models or complexity of operations performed. The recommendation models may be used in diverse fields such as, media and entertainment, finance, e-commerce, retail, banking, telecom, and so on. The recommendation models may enhance an item-search experience and a usage experience of an application. For example, the search experience may be improved if the recommended items are determined based on accurate predictions of user queries for items. The user satisfaction may be enhanced if a recommended item interests the user and inspires the user to query for similar items. Further, the recommendation models may facilitate businesses to improve sales of offered items and determine items that may be of interest to users. For example, the sales of the items may improve because the recommendation models may provide the businesses with better understanding of personal requirements and behavior of individual users.

Typically, a recommendation model may recommend an item (for example, a movie) associated with a domain (for example, movies domain for an over the top platform), to a user, based on parameters such as personal particulars/profile of the user, a watch history of the user, a movie consumption pattern (for example, an amount of time spent to watch each movie), a watch history of other users that are identified as similar to the user, a genre of movies in the watch history, and so on. In order to recommend an item (for example, a movie) based on such parameters, the recommendation model may require a significant of amount data that may be generated based on consumption of items associated with the domain by the user and the other users over a considerable period of time. The data may be collected by the recommendation systems as the user and other users may consume items associated with the domain. The accuracy or relevancy of the recommendation model may be dependent on the amount of data collected by the recommendation model. However, there may be scenarios where sufficient amount of data may not be available to the recommendation model to provide accurate or relevant recommendations.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for generation of recommendations using trust-based embeddings, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
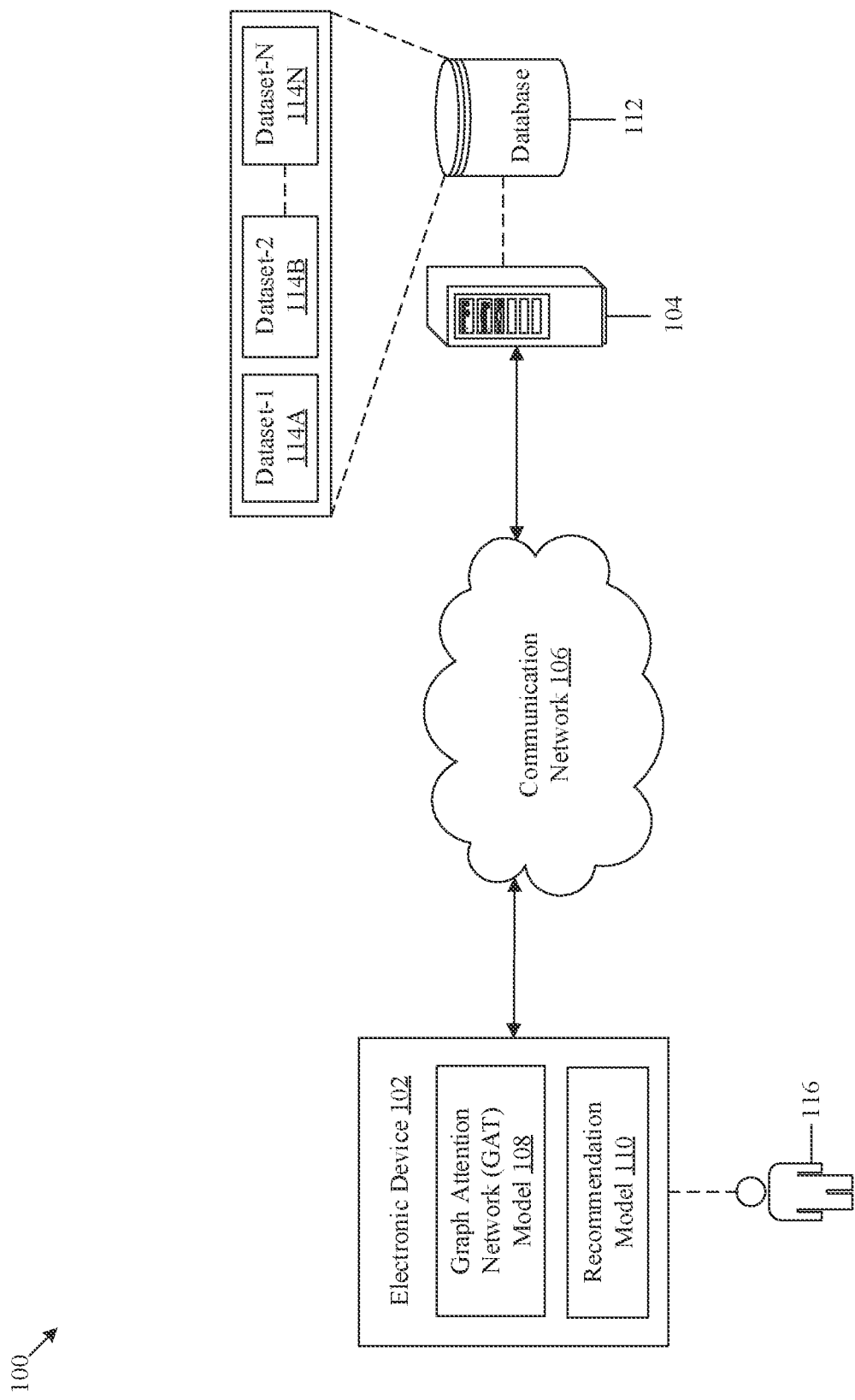
FIG. 1 is a diagram that illustrates an exemplary network environment for generation of recommendations using trust-based embeddings, in accordance with an embodiment of the disclosure.

The following described implementations may be found in a disclosed electronic device and method for generation of recommendations using trust-based embeddings. Exemplary aspects of the disclosure provide an electronic device (for example, a mobile phone, a smart phone, a desktop, a laptop, a personal computer, and the like) that may generate trust-based embeddings, and update or modify embeddings associated with users, based on the generated trust-based embeddings for generation of the recommendations. The electronic device may determine first correlation information (for example, a set of trust scores) associated with a first set of users and further associated with a first domain (for example, a movies domain) of a set of domains. The electronic device may generate, based on the first correlation information, a first vector indicative of a trust embedding associated with a first user of the first set of users, with respect to the first set of users, in the first domain. The electronic device may further receive second correlation information (for example, a set of trust scores) associated with a second set of users (that includes the first user and one or more users of the first set of users) and further associated with a second domain (for example, a shows domain) of the set of domains. The electronic device may further apply a Graph Attention Network (GAT) model on the determined second correlation information. The electronic device may determine, based on the application of the GAT model, a second vector indicative of a trust embedding of the first user, with respect to the second set of users, in the second domain. The electronic device may further recommend one or more items (for example, items associated with a first domain) for the first user, based on the determined first vector and the determined second vector. In an example, the electronic device may apply a recommendation model on the determined first vector and the determined second vector. The one or more items may be recommended, based on the application of the recommendation model on the determined first vector and the determined second vector. The electronic device may further render the recommended one or more items on a display device associated with the electronic device Typically, a recommendation system may recommend items, associated with a domain, based on one or more parameters such as personal particulars (for example, age, gender, demographic information, and so on) associated with a target user, item consumption history, item consumption pattern, similarity between items to be recommended and items consumed by the target user, item consumption history of other users with item consumption history that is similar to that of the target user, and so on. In some other typical recommendation systems, user embeddings may be generated based on features extracted from the one or more parameters. Thereafter, the recommendation system may use an embedding associated with the target user to determine users that may be similar to the target user. The recommendation system may recommend items to the target user based on the items consumed by the determined similar users. Further, the recommendation system may generate embeddings associated with items (for example, movies) based on features (for example, a genre, a length, a cast, a studio, and so on) of a domain. The recommendation system may compare the embeddings of the items in the item consumption history of the target user and the items of the domain. The recommendation system may recommend items of the domain associated with embeddings that are similar to the embeddings of the items in the item consumption history. For the recommendation system, to generate a reliable or relevant recommendation, the target user may need to consume a significant number of items of the domain.

However, there may be scenarios in which the recommendation system may encounter issues such as "data sparsity" or "cold start", due to lack of (or unavailability of) sufficient amount of data associated with consumption of items of the domain by the target user. For example, sufficient data associated with consumption of items may not be available if the user is a new consumer of items associated with the domain. In such scenarios, the embedding associated with the user, generated by the recommendation model, may not be accurate. This may affect reliability or relevancy of the generated recommendations.

In order to address such issues, the disclosed electronic device may use a recommendation model that may use vectors (for example, the first vector and the second vector) indicative of trust-based embeddings of a target user for multiple domains. The trust-based embeddings may be used to generate a user embedding to recommend items associated with a domain (for example, a first domain or target domain) to a user (for example, the first user or target user). The electronic device may determine the trust-based embeddings based on correlation information (for example, the first correlation information and the second correlation) across multiple domains. The first correlation information may be indicative of trust of the first user with respect to a first set of users associated with the first domain. Similarly, the second correlation may be indicative of trust of the first user with respect to a second set of users associated with a second domain. The trust of the first user with respect to the first set of users and the second set of users may be determined based on ratings of items associated with the items of the first domain and the second domain, respectively, provided by the first set of users and the second set of users. The electronic device may update or modify a user embedding associated the first user by use of the trust-based embeddings.

Thus, the electronic device may leverage the trust of the first user with respect to a plurality of users associated with a target domain (i.e., the first domain) and one or more auxiliary domains (for example, the second domain) to determine reliable trust-based embeddings (i.e., the first vector and the second vector). The electronic device may utilize the trust-based embeddings associated with multiple domains to update or modify the user embedding (for example, a third vector) associated with the first user. The recommendation model may generate accurate recommendations by use of the updated user embedding, since the usage of the updated user embedding may allow accurate determination of users that may be "similar" to the first user and "trusted" by the first user, across multiple domains. The recommendation model may recommend items associated with the first domain based on a consumption history or consumption pattern of items associated with the "similar" or "trusted" users across the target domain and one or more auxiliary domains. The electronic device may be enabled to effectively manage "data sparsity" or "cold start" issues, since data insufficiency may be avoided via leveraging of the trust of the target user (i.e., the first user) with respect to the first set of users and the second set of users across a plurality of domains (for example, the first domain and the second domain).

FIG. 1 is a diagram that illustrates an exemplary network environment for generation of recommendations using trust-based embeddings, in accordance with an embodiment of the disclosure. With reference to FIG. 1, there is shown a network environment 100. The network environment 100 includes an electronic device 102 and a server 104. The electronic device 102 may communicate with the server 104 through one or more networks (such as, a communication network 106). The electronic device 102 may include a Graph Attention Network (GAT) model 108 and a recommendation model 110. The server 104 may include a database 112. The database 112 may include a plurality of datasets, viz., a dataset-1 114A, a dataset-2 114B, . . . , and a dataset-N 114N. There is further shown a user 116 (for example, a first user) associated with the electronic device 102. The electronic device 102 may generate trust-based embeddings, update a user embedding associated with the user 116 based on the trust-based embeddings, generate recommendations based on the updated user embedding, and recommend items to the user 116, based on the generated recommendations.

The N number of datasets shown in FIG. 1 are presented merely as an example. The database 112 may include only two or more than N datasets, without deviation from the scope of the disclosure. For the sake of brevity, only N datasets have been shown in FIG. 1. However, in some embodiments, there may be more than N datasets without limiting the scope of the disclosure.

The electronic device 102 may include suitable logic, circuitry, interfaces, and/or code that may be configured to determine first correlation information associated with a first set of users. The first correlation information and the first set of users may be associated with a first domain of a set of domains. The first set of users may include the first user (i.e., the user 116). The electronic device 102 may generate, based on the first correlation information, a first vector indicative of a trust embedding of the first user (i.e., the user 116) with respect to the first set of users in the first domain. The electronic device 102 may receive second correlation information associated with a second set of users. The second set of users may include the user 116 and one or more users of the first set of users. For example, each of the first set of users and the second set of users may include the first user and a plurality of second users. The plurality of second users may be common to both the first set of users and the second set of users. The second correlation information and the second set of users may be associated with the second domain of the set of domains. The electronic device 102 may apply the GAT model 108 on the second correlation information and generate, based on the application of the GAT model 108, a second vector indicative of a trust embedding of the first user (i.e., the user 116) with respect to the second set of users in the second domain. The electronic device 102 may apply the recommendation model 110 on the first vector and the second vector. The electronic device 102 may recommend one or more items to the first user, based on the application of the recommendation model 110 on the determined first vector and the determined second vector. The electronic device 102 may render the recommended one or more items on a display device associated with the electronic device 102. Examples of the electronic device 102 may include, but may not be limited to, a desktop, a tablet, a television (TV), a laptop, a computing device, a smartphone, a cellular phone, a mobile phone, a recommendation system, a consumer electronic (CE) device having a display.

The server 104 may include suitable logic, circuitry, interfaces, and/or code that may be configured to receive requests from the electronic device 102 for rating information associated with each of a set of users (for example, the first set of users) for a set of items associated with a domain (for example, the first domain). The server 104 may be configured to extract the requested rating information from the database 112. The server 104 may transmit the extracted rating information to the electronic device 102. In some embodiments, the server 104 may be configured to store the GAT model 108 and the recommendation model 110. In an embodiment, the server 104 may be configured to determine the first correlation information and the second correlation information, generate the first vector and the second vector, apply the recommendation model 110 on the generated first vector and the generated second vector. Further, the server 104 may generate recommendations indicative of the one or more items based on the application, and transmit the recommendations to the electronic device 102 (for rendering by the electronic device 102). The server 104 may execute operations through web applications, cloud applications, HTTP requests, repository operations, file transfer, and the like. Example implementations of the server 104 may include, but are not limited to, a database server, a file server, a web server, an application server, a mainframe server, a cloud computing server, or a combination thereof.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102 as two separate entities. In certain embodiments, the functionalities of the server 104 can be incorporated in its entirety or at least partially in the electronic device 102, without a departure from the scope of the disclosure.

The communication network 106 may include a communication medium through which the electronic device 102 and the server 104 may communicate with each other. The communication network 106 may be a wired or wireless communication network.

Examples of the communication network 106 may include, but are not limited to, Internet, a cloud network, Cellular or Wireless Mobile Network (such as Long-Term Evolution and $5^{th}$ Generation (5G) New Radio (NR)), satellite communication system (using, for example, low earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 106, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The GAT model 108 may be based on a neural network architecture. The GAT model 108 may include one or more self-attentional layers and operate based on graph-structured data. The GAT model 108 may include a set of nodes that may be associated with a set of users in a domain and represent user embeddings associated with the set of users. For example, a node associated with the user 116 may be representative of a user embedding associated with the user 116. Each node may be connected to a plurality of nodes that may be neighbors of the corresponding node in the graph-structured data. For example, the node associated with the user 116 may be connected to nodes associated with users that may be determined as neighbors of the user 116, based on the first correlation information or the second correlation information.

The GAT model 108 may capture weights via an attention mechanism. The nodes may be associated with the captured weights, which may be determined based on the correlation information (i.e., the first correlation information and the second correlation information). Each node of the GAT model 108 may represent a set of node features. The set of node features represented by a node may correspond to features used to generate a user embedding represented by the node. The set of node features may be updated based on attention coefficients. For example, a current set of node features of a node associated with the user 114 may undergo a first linear transformation based on the captured weights. The first linear transformation may be followed by a second linear transformation, via a self-attention mechanism, for generation of attention coefficients. The attention coefficients may be passed through an activation function (for example, a leaky rectified linear unit), prior to a normalization of the attention coefficients with respect to the current set of node features using a softmax function. Thereafter, an updated set of node features may be generated, based on an application of non-linearity. The updated set of node features may be representative of the trust-based embeddings of the user 116. Similarly, trust-based embeddings of other users of the first set of users or the second set of users can be generated based on updates in node features of the nodes associated with the corresponding other users.

The recommendation model 110 may be based on a matrix factorization and/or deep learning based neural networks. For example, the recommendation model 110 may be a cross-domain collaborative filtering-based model. The recommendation model 110 may be trained to determine a diversity between domains (for example, the first domain and the second domain) and relationships between entities (for example, users of the first set of users or the second set of users and items associated with the first domain or the second domain) within a domain or across a set of domains. The recommendation model 110 may receive, as inputs, the trust-based embeddings of each of a set of users. For, example, the recommendation model 110 may receive the trust-based embeddings (i.e., the first vector and the second vector) of user 116 with respect to the first set of users and the second set of users, and a user embedding (i.e., a third vector) associated with the user 116. The recommendation model 110 may update the user embedding (i.e., the third vector) associated with the user 116 based on the trust-based embeddings (i.e., the first vector and the second vector). The updated user embedding associated with the user 116 may be used to recommend items associated with a target domain (for example, the first domain of the set of domains) to a target user (for example, the user 116).

Each of the GAT model 108 and the recommendation model 110 may correspond to a model that may include electronic data, which may be implemented as, for example, a software component of an application executable on the electronic device 102. Each model may rely on libraries, external scripts, or other logic/instructions for execution by a processing device, such as, the electronic device 102. Each model may include code and routines configured to enable a computing device, such as, the electronic device 102, to perform one or more operations to recommend one or more items to the first user (i.e., the user 116). Additionally, or alternatively, each model may be implemented using hardware including a processor, a microprocessor (e.g., to perform or control performance of one or more operations), a field-programmable gate array (FPGA), or an application-specific integrated circuit (ASIC). Alternatively, in some embodiments, each model may be implemented using a combination of hardware and software.

The database 112 may include suitable logic, interfaces, and/or code that may be configured to store the rating information associated with each set of users (for example, the first set of users) for a set of items associated with each domain (for example, the first domain) of a set of domains. The dataset-1 114A may include rating information associated with the first set of users, for a set of items associated with a first domain. The dataset-2 114B may include rating information associated with the second set of users, for a set of items associated with second domain. Similarly, the dataset-N 114N may include rating information associated with the $N^{th}$ set of users, for a set of items associated with $N^{th}$ domain. The database 112 may be derived from data off a relational or non-relational database or a set of comma-separated values (csv) files in conventional or big-data storage. The database 112 may be stored or cached on a device, such as the server 104. The device storing the database 112 may be configured to query the database 112 for the rating information based on reception of the request for the rating information from the electronic device 102. In response, the device storing the database 112 may be configured to retrieve, from the database 112, results (for example, the dataset-1 114A, the dataset-2 1148, . . . , and the dataset-N 114N) based on the received query.

In some embodiments, the database 112 may be hosted on a plurality of servers stored at same or different locations. The operations of the database 112 may be executed using hardware including a processor, a microprocessor (e.g., to perform or control performance of one or more operations), a field-programmable gate array (FPGA), or an application-specific integrated circuit (ASIC). In some other instances, the database 112 may be implemented using software.

In operation, the electronic device 102 may be configured to determine the first correlation information associated with the first set of users and further associated with the first domain of the set of domains. The set of domains may correspond to at least one of a set of modes or a set of application areas. The first set of users may include the first user (i.e., the user 116). The first correlation information may include an association between the user 116 and a plurality of second users of the first set of users. The association may be determined based on rating information. The electronic device 102 may receive rating information associated with the first set of users for a set of items associated with the first domain. For example, the items may correspond to movies and the first domain may correspond to a movies domain of an over-the-top (OTT) platform. The first set of users may include 10 users and the first domain may include 10 movies. The first set of users may include the user 116 and 9 other users. The electronic device 102 may receive rating information associated with each of the 10 users for one or more movies of the 10 movies associated with the movies domain of the OTT platform. The determination of the first correlation information is described further, for example, in FIG. 3.

The electronic device 102 may further determine a trust score of the first user with respect to each of the first set of users based on the rating information. For example, the electronic device 102 may determine 9 trust scores indicative of trust of the user 116 with respect to the other 9 users and a trust score indicative of trust of the user 116 on himself/herself. A trust score of the user 116 with respect to another user of the first set of users may be determined based on co-positive ratings of one or more items of the set of items (for example, the 10 movies) by the user 116 and the other user. The trust score of the user 116 with respect to the other user may be determined further based on ratings of one or more items of the set of items (for example, the 10 movies) by the other user. The trust score of the user 116 with respect to himself/herself may be 1. Similarly, the electronic device 102 may determine a trust score of each user (apart from the user 116) of the first set of users with respect to each of the first set of users. Thus, the electronic device may determine 100 trust scores (i.e., 10 trust scores for each user of the first set of users). In accordance with an embodiment, the electronic device 102 may determine the first correlation information based on the 100 trust scores. The determination of the trust score of the first user is described further, for example, in FIG. 3.

The electronic device 102 may be further configured to generate, based on the first correlation information, a first vector indicative of a trust embedding of the first user (i.e., the user 116) of the first set of users, with respect to the first set of users, in the first domain. The electronic device 102 may generate the first vector indicative of the trust embedding of the user 116 with respect to the first set of users. In accordance with an embodiment, the electronic device 102 may determine, based on the first correlation information, the plurality of second users that may be associated with the user 116. The determination may be based on a comparison of the trust score of the user 116 with respect to each of the first set of users. The comparison may indicate that the trust score of the user 116 with respect to each of the plurality of second users may be greater than a predefined threshold. The electronic device 102 may determine first neighborhood information associated with the first user (i.e., the user 116) and further associated with the first domain, based on the determined first correlation information. The first neighborhood information may be indicative of users of the first set of users correlated to the first user (i.e., the user 116). The users of the first set of users correlated with the user 116 may correspond to the plurality of second users, since the trust score of the user 116 with respect to each user of the plurality of second users may be greater than the predefined threshold.

The electronic device 102 may generate the first vector based on the determined first neighborhood information. In accordance with an embodiment, the electronic device 102 may concatenate user embeddings associated with the plurality of second users, correlated with the user 116, to determine the first vector. For example, the plurality of second users may correspond to 4 users of the first set of users, who may be correlated with the user 116. In such case, the electronic device 102 may concatenate four vectors, which may be representative of user embeddings associated with the 4 users, to generate the first vector. The generation of the first vector is described further, for example, in FIG. 3.

The electronic device 102 may be further configured to receive the second correlation information associated with a second set of users and further associated with a second domain of the set of domains. The second set of users may include the first user (i.e., the user 116) and one or more users of the first set of users. For example, each of the first set of users and the second set of users may include the first user and a plurality of second users. The plurality of second users may be common to both the first set of users and the second set of users. The second correlation information may include an association between the user 116 and a plurality of third users of the second set of users. The association may be determined based on rating information associated with the second set of users. The electronic device 102 may receive rating information associated with the second set of users for a set of items associated with the second domain. For example, the items may correspond to shows and the second domain may correspond to shows domain of an OTT platform. The second set of users may include 10 users (including the user 116 and the one or more users of the first set of users) and the second domain may include 10 shows. The electronic device 102 may receive rating information associated with each of the 10 users for one or more of the 10 shows associated with the shows domain of the OTT platform.

The electronic device 102 may further determine a trust score of the first user with respect to each of the second set of users based on the rating information. Similarly, the electronic device 102 may determine a trust score of each user (apart from the user 116) of the second set of users with respect to each of the second set of users. In accordance with an embodiment, the electronic device 102 may determine the second correlation information based on the determined trust scores.

The electronic device 102 may be further configured to determine, based on the second correlation information, the plurality of third users that are correlated to the user 116. The trust score of the first user (i.e., the user 116) with respect to each of the plurality of third users may be greater than the predefined threshold. The electronic device 102 may determine second neighborhood information associated with the first user (i.e., the user 116) and further associated with the second domain, based on the determined second correlation information. The second neighborhood information may be indicative of users of the second set of users that are correlated to the first user (i.e., the user 116). The users of the second set of users correlated to the user 116 may correspond to the plurality of third users since the trust score of the user 116 with respect to each user of the plurality of third users is greater than the predefined threshold.

The electronic device 102 may be configured to apply the GAT model 108 on the determined second neighborhood information. The GAT model 108 may include a node associated with the user 116 and a node associated with each of the plurality of third users. The nodes of the GAT model 108 may represent user embeddings associated with the user 116 and each of the plurality of third users. For example, a portion of the GAT model 108 (from the viewpoint of the node associated with the user 116) may include 5 nodes. The nodes may be associated with the user 116 and the 4 users that correspond to the plurality of third users. The nodes associated with the plurality of third users may be connected to the node associated with the user 116. Each node associated with a user of the plurality of third users may be further associated with a weight. The weight associated with a node may be based on (for example, directly proportional to) a trust score of the user 116 with respect to a corresponding user of the plurality of third users associated with the node. The GAT model 108 may further determine, for each node associated with a user of the plurality of third users, a weighted vector. The determination of the second neighborhood information may be based on a weight associated with the node and a user embedding represented by the node. For example, the GAT model 108 may determine 4 weighted vectors associated with the 4 nodes (associated with the plurality of third users). In such case, the second neighborhood information may be determined based on the determined 4 weighted vectors associated with the 4 nodes.

The electronic device 102 may be further configured to generate, based on the application of the GAT model 108, the second vector indicative of a trust embedding of the first user (i.e., the user 116), with respect to the second set of users, in the second domain. In accordance with an embodiment, the electronic device 102 may concatenate the weighted vectors associated with the plurality of third users, correlated with the user 116, to determine the second vector. In accordance with an embodiment, the electronic device 102 may compute an average of the weighted vectors associated with the plurality of third users, correlated with the user 116, to determine the second vector. For example, the electronic device 102 may concatenate 4 weighted vectors, or compute an average of the 4 weighted vectors, to generate the second vector. The determination of the second vector is described further, for example, in FIG. 3.

The electronic device 102 may be further configured to apply the recommendation model 110 on the first vector and the second vector. In some embodiments, the recommendation model 110 may be further applied on a third vector, which may be representative of a user embedding associated with the user 116. The third vector may represent an initial user embedding associated with the user 116. The third vector may be generated when the user 116 starts consumption of the set of items associated with the first domain. The third vector may be indicative of collaborative filtering information associated with the first user (i.e., the user 116), preference information associated with the user 116, demographic information associated with the user 116, or a purchase history associated with the user 116. The electronic device 102 may generate an updated user embedding associated with the user 116 based on the application of the recommendation model 110 on the first vector, the second vector, and the third vector.

It may be noted that the first vector and the second vector may be generated based on consumption of items associated with the first domain and the second item, by the user 116 and other users of the first set of users and the second set of users. Therefore, the first vector and the second vector may be updated based on further updates in data associated with consumption of items associated with the first domain and the second item by the first set of users and the second set of users, and inclusion of new users in the first set of users and the second set of users.

The electronic device 102 may be further configured to recommend one or more items to the first user (i.e., the user 116), based on the application of the recommendation model 110 on the first vector and the second vector. The recommendation model 110 may generate a recommendation that may include the one or more items. The recommended one or more items may be associated with the first domain (i.e., target domain). The determination of the recommendation of the one or more items is described further, for example, in FIG. 3.

The electronic device 102 may be further configured to render the recommended one or more items on a display device associated with the electronic device 102. In accordance with an embodiment, the electronic device 102 may further render a user interface element on the display device. The electronic device 102 may receive user inputs from the user 116 via the user interface element. The user input may be indicative of a rating associated with a relevancy of the generated recommendation.

Figure 2:
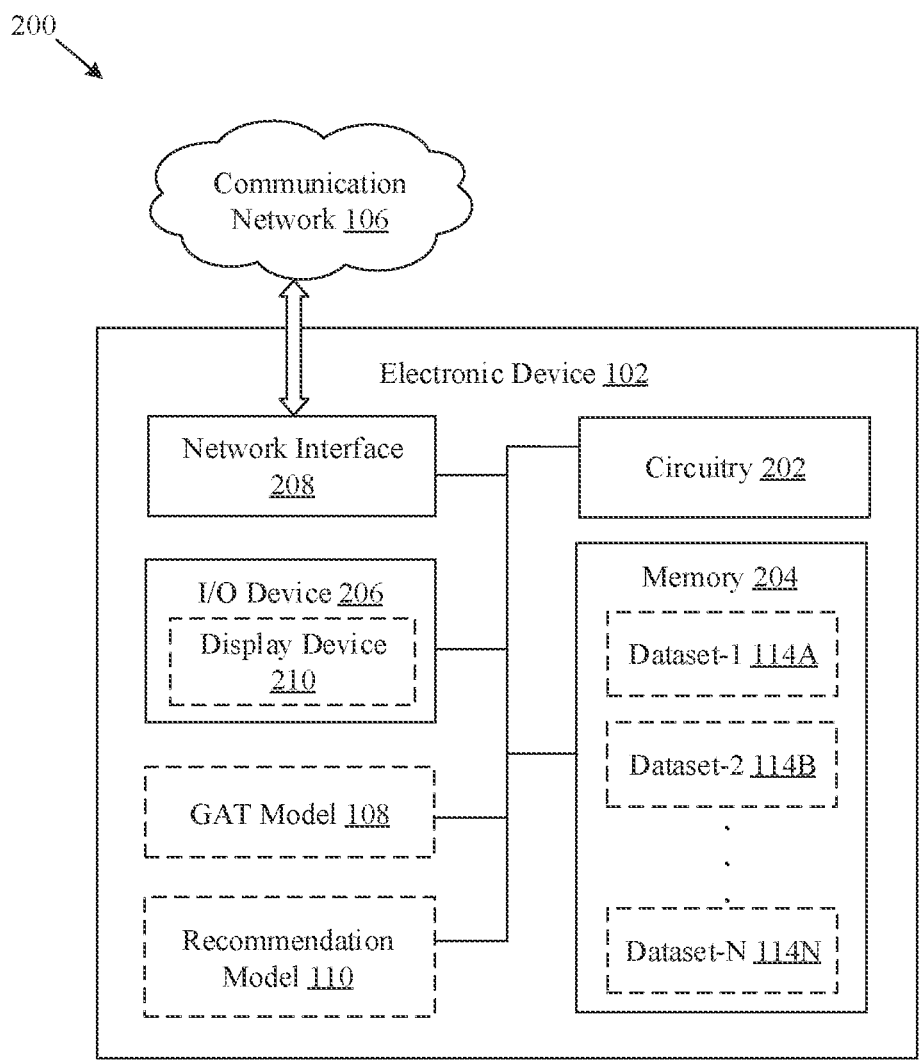
FIG. 2 is a block diagram that illustrates an exemplary electronic device of FIG. 1, for generation of recommendations using trust-based embeddings, in accordance with an embodiment of the disclosure.

FIG. 2 is a block diagram that illustrates an exemplary electronic device of FIG. 1, for generation of recommendations using trust-based embeddings, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202, a memory 204, an input/output (I/O) device 206, a network interface 208, the GAT model 108, and the recommendation model 110. In at least one embodiment, the I/O device 206 may also include a display device 210. In at least one embodiment, the memory 204 may include the dataset-1 114A, the dataset-2 114B, . . . , and the dataset-N 114N. The circuitry 202 may be communicatively coupled to the memory 204, the I/O device 206, the network interface 208, the GAT model 108, and the recommendation model 110, through wired or wireless communication of the electronic device 102.

The circuitry 202 may include suitable logic, circuitry, and interfaces that may be configured to execute program instructions associated with different operations to be executed by the electronic device 102. The operations may include determination of the first correlation information associated with the first set of users and further associated with the first domain of a set of domains. The operations may further include generation, based on the first correlation information, the first vector indicative of the trust embedding of the first user (i.e., the user 116) with respect to the first set of users in the first domain. The operations may further include reception of the second correlation information associated with the second set of users and further associated with the second domain of the set of domains. The operations may further include the application of the GAT model 108 on the determined second correlation information. The operations may further include generation, based on the application of the GAT model 108, the second vector indicative of the trust embedding of the first user (i.e., the user 116), with respect to the second set of users, in the second domain. The operations may further include application of the recommendation model 110 on the first vector and the second vector. The operations may further include recommendation of the one or more items to the first user (i.e., the user 116), based on the application of the recommendation model 110 on the first vector and the second vector. The operations may further include rendering of the recommended one or more items on the display device 210 associated with the electronic device 102. The circuitry 202 may include one or more specialized processing units, which may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, interfaces, and/or code that may be configured to store the program instructions to be executed by the circuitry 202. The program instructions stored on the memory 204 may enable the circuitry 202 to execute operations of the circuitry 202 (and/or the electronic device 102). In at least one embodiment, the memory 204 may store the dataset-1 114A, the dataset-2 114B, . . . , and the dataset-N 114N, which may be retrieved from the database 112. The memory 204 may further store a first user-item matrix generated based on rating information associated with the first set of users, for a set of items associated with first domain. Similarly, the memory 204 may store a second or an $N^{th}$ user-item matrix generated based on rating information associated with a second or an $N^{th}$ set of users, for a set of items associated with a second or an $N^{th}$ domain, respectively. The memory 204 may further store the determined first correlation information and the determined second correlation information. In some embodiments, the memory 204 may further store the GAT model 108 and/or the recommendation model 110. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a user input from the user 116. The user input may be indicative of a rating provided by the user 116 for one or more items (e.g., movies/video content) consumed (or viewed) by the user 116. In some embodiments, the I/O device 206 may receive a user input from the user 116 that is indicative of a relevancy rating associated with a rendered recommendation. The relevancy rating may indicate whether the recommendation is relevant to the user 116 or whether the user 116 is interested in one or more items included in the recommendation. Examples of the I/O device 206 may include, but are not limited to, a touch screen, a keyboard, a mouse, a joystick, a microphone, the display device 212, and a speaker. Examples of the I/O device 206 may further include braille I/O devices, such as, braille keyboards and braille readers.

The I/O device 206 may include the display device 210. The display device 210 may include suitable logic, circuitry, and interfaces that may be configured to receive inputs from the circuitry 202 to render, on a display screen, one or more items associated with a domain (for example, the first domain) that have been recommended to the user 116 (i.e., the first user). In at least one embodiment, the display screen may be at least one of a resistive touch screen, a capacitive touch screen, or a thermal touch screen. The display device 210 or the display screen may be realized through several known technologies such as, but not limited to, at least one of a Liquid Crystal Display (LCD) display, a Light Emitting Diode (LED) display, a plasma display, or an Organic LED (OLED) display technology, or other display devices.

The network interface 208 may include suitable logic, circuitry, and interfaces that may be configured to facilitate a communication between the circuitry 202 and the server 104, via the communication network 106. The network interface 208 may be implemented by use of various known technologies to support wired or wireless communication of the electronic device 102 with the communication network 106. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, or a wireless network, such as a cellular telephone network, a wireless local area network (LAN), a short-range communication network, and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), $5^{th}$ Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a near field communication protocol, and a wireless pear-to-pear protocol.

The functions or operations executed by the electronic device 102, as described in FIG. 1, may be performed by the circuitry 202. Operations executed by the circuitry 202 are described in detail, for example, in FIGS. 3, 4, 5, 6, and 7.

Figure 3:
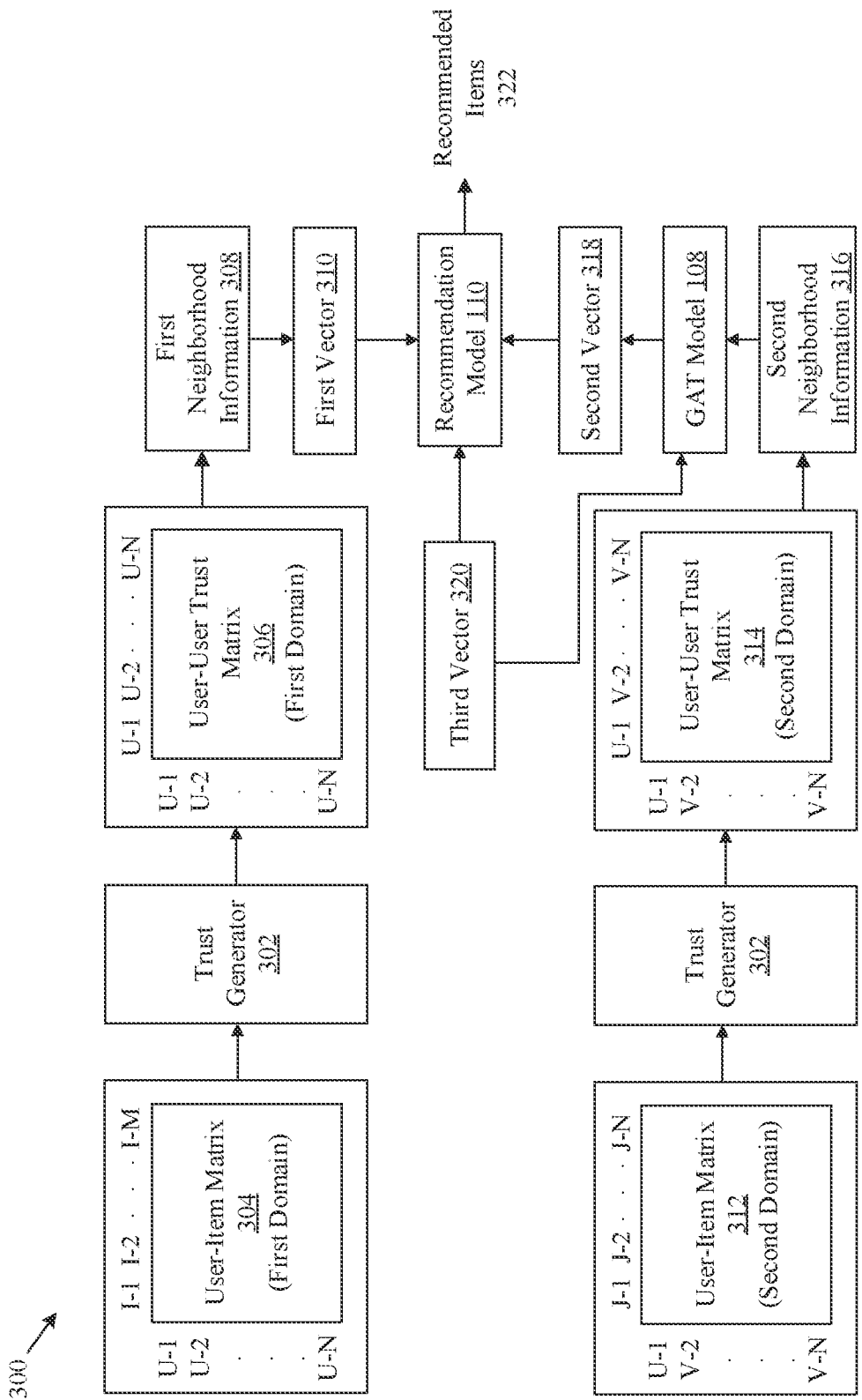
FIG. 3 is a diagram that illustrates an exemplary scenario for application of a recommendation model on trust-based embeddings for generation of recommendations for items, in accordance with an embodiment of the disclosure.

FIG. 3 is a diagram that illustrates an exemplary scenario for application of a recommendation model on trust-based embeddings for generation of recommendations for items, in accordance with an embodiment of the disclosure. FIG. 3 is explained in conjunction with elements from FIG. 1 and FIG. 2. With reference to FIG. 3, there is shown an exemplary scenario 300. In the exemplary scenario 300, there is shown a trust generator 302 that may generate user-user trust matrices, based on user-item matrices. The trust generator 302 may be a software that may include program instructions executable on the electronic device 102 by the circuitry 202 to determine trust scores of users with respect to other users. Additionally, or alternatively, the trust generator 302 may be implemented using hardware including a processor, a microprocessor, a FPGA, or an ASIC. There is further shown, the GAT model 108 of FIG. 1 and the recommendation model 110 of FIG. 1. The recommendation model 110 may recommend items associated with a target domain (i.e., a first domain of a set of domains. The set of domains may correspond to at least one of a set of modes or a set of application areas.) to a target user (for example, the user 116) based on trust-based embeddings of the target user with respect to the first set of users and the second set of users, and a user embedding associated with the target user. An example of a scenario for recommendation of items across domains (i.e., cross-domain or across a set of application areas) is provided, for example, in FIG. 7. Also, an example of a scenario for recommendation of items across modes (i.e., multi-modal) is provided, for example, in FIG. 8.

In accordance with an embodiment, the circuitry 202 may be configured to receive rating information associated with a first set of users for a set of items associated with a first domain. The first domain may be referred to as target domain. The circuitry 202 may be configured to recommend items associated with the target domain. The first set of users may include users, such as, "$U_1$", "$U_2$", . . . , and "$U_N$". The user "$U_1$" may correspond to the first user (i.e., the user 116) or the target user. The circuitry 202 may be configured to render the (recommended) items associated with the target domain on the display device 210 that may be viewed by the target user (i.e., the user 116 or "$U_1$"). The set of items associated with the first domain may include items, such as, "$I_1$" "$I_2$" . . . , and "$I_M$". The circuitry 202 may receive rating information from each user of the first set of users for one or more items of the set of items associated with the first domain. The circuitry 202 may be configured to generate a user-item matrix 304 for the first domain, based on the received rating information. Each row of the user-item matrix 304 may correspond to rating information associated with a user of the first set of users for the set of items associated with the first domain. Further, each column of the user-item matrix 304 may correspond to rating information associated with the first set of users for an item of the set of items associated with the first domain. For example, the first row of the user-item matrix 304 may be indicative of rating information associated with "$U_1$" or the user 116 for the items "$I_1$", "$I_2$", ..., and "$I_M$". Similarly, the first column of the user-item matrix 304 may be indicative of rating information associated with the first set of users "$U_1$", "$U_2$", ..., and "$U_N$" for the item "$I_1$".

The trust generator 302 may receive the user-item matrix 304 as an input and generate a user-user trust matrix 306 for the first domain as an output. The user-user trust matrix 306 may correspond to the first correlation information associated with the first set of users (i.e., the users "$U_1$", "$U_2$", ..., and "$U_N$"). The circuitry 202 may determine, via the trust generator 302, a trust score of each user (of the first set of users) with respect to (each of) the other users of the first set of users, based on the rating information. For example, the trust generator 302 may determine a trust score of the user "$U_1$" with respect to each of the users "$U_2$", ... "$U_N$", based on the rating information. The first row of the user-user trust matrix 306 may include the trust score of the user "$U_1$" with respect to each of the users "$U_1$", ... "$U_N$". Similarly, the second row of the user-user trust matrix 306 may include the trust score of the user "$U_2$" with respect to each of the users "$U_1$", ... "$U_N$", ... and the $N^{th}$ row of the user-user trust matrix 306 may include the trust score of Nth user (i.e., "$U_N$") with respect to each of the users "$U_1$", ... "$U_N$". In some embodiments the trust score of a user with respect to the same user may be set as "1". Therefore, the diagonal elements of the user-user trust matrix 306 may all be "1".

In accordance with an embodiment, the trust score of a user of the first set of users with respect to another user of the first set of users may be determined based on co-positive ratings of one or more items of the set of items by the user and the other user. The trust score of the user with respect to the other user may be further determined based on the ratings of one or more items of the set of items by the other user. For example, the trust score of the user "$U_1$" with respect to the user "$U_2$" may be determined, based on co-positive ratings of one or more items of the set of items "$I_1$" ... "$I_M$", by the users "$U_1$" and "$U_2$" and ratings of one or more items of the set of items "$I_1$" ... "$I_M$", by the user "$U_2$". The co-positive ratings of the one or more items of the set of items by the users "$U_1$" and "$U_2$" may be obtained from the first and second rows respectively of the user-item matrix 304. Further, the ratings of the one or more items of the set of items by the user "$U_2$" may be obtained from the second row of the user-item matrix 304.

It may be noted that the trust score of the user "$U_1$" with respect to the user "$U_2$" may be determined based on co-positive ratings of all items of the set of items, if the rating information associated with each of the users "$U_1$" and "$U_2$" is available for all items of the set of items "$I_1$", ... "$I_M$".

In accordance with an embodiment, the circuitry 202 may be configured to determine first neighborhood information 308 associated with the user "$U_1$" (i.e., the user 116), based on the first correlation information (i.e., the user-user trust matrix 306). The determined first neighborhood information 308 may be indicative of users of the first set of users (i.e., the users "$U_1$", ..., "$U_N$") who may be correlated to the user "$U_1$". The circuitry 202 may determine the users, who may be correlated with the user "$U_1$", based on a comparison of the trust score of the user "$U_1$" with respect to each of the users "$U_2$", ... "$U_N$" with a predefined threshold. The circuitry 202 may obtain the trust score of the user "$U_1$" with respect to each of the users "$U_2$", ... "$U_N$" based on the first row of the user-user trust matrix 306. The comparison may indicate that the trust score of the user "$U_1$" with respect to each user correlated to the user "$U_1$" may be greater than the predefined threshold. The users of the first set of users who may be correlated to the user "$U_1$" (i.e., the first user or the user 116) may correspond to the plurality of second users of the first set of users or neighbors of the user "$U_1$" in the first domain. Thus, the first correlation information (i.e., the user-user trust matrix 306) may include the first neighborhood information 308 and information pertaining to the association between the first user (i.e., the user "$U_1$") and the plurality of second users. The circuitry 202 may similarly determine neighborhood information associated with each of the remaining users of the first set of users associated with the first domain, based on the first correlation information (i.e., the user-user trust matrix 306).

The circuitry 202 may be further configured to generate a first vector 310 based on the first neighborhood information 308. The first vector 310 may be indicative of a trust embedding of the user "$U_1$" (i.e., the first user or the user 116) with respect to the first set of users "$U_1$", ... "$U_N$". In accordance with an embodiment, the circuitry 202 may be configured to obtain user embeddings associated with the users (i.e., neighbors of "$U_1$") correlated to the user "$U_1$". The circuitry 202 may concatenate the user embeddings associated with the users correlated to the user "$U_1$" (i.e., the plurality of second users) to generate the first vector 310.

In accordance with an embodiment, the circuitry 202 may be configured to receive rating information associated with a second set of users for a set of items associated with a second domain. The second domain may be referred to as an auxiliary domain. The second set of users may include users "$U_1$", "$V_2$", ..., and "$V_N$". The second set of users may include the user "$U_1$" (i.e., the target user) and one or more users of the first set of users. The one or more users of the first set of users, included in the second set of users, may be referred to as common users (or users common to the first set of users and the second set of users). For example, each of the first set of users and the second set of users may include the first user and a plurality of second users. The plurality of second users may be common to both the first set of users and the second set of users. For example, if the one or more users of the first set of users included in the second set of users are "$U_2$" "$U_3$" and "$U_4$", then the users "$U_2$", "$U_3$", and "$U_4$" may correspond to users "$V_2$", "$V_3$", and "$V_4$", respectively. The set of items associated with the first domain may include items "$J_1$" "$J_2$" ..., and "$J_N$". The circuitry 202 may be configured to generate a user-item matrix 312 for the second domain based on rating information associated with each user of the second set of users for the set of items "$J_1$", "$J_2$", ..., and "$J_N$". Each row of the user-item matrix 312 may correspond to rating information associated with a user of the second set of users for items "$J_1$", "$J_2$", ..., and "$J_N$". Further, each column of the user-item matrix 304 may correspond to rating information associated with the second set of users for an item amongst items "$J_1$", "$J_2$", ..., and "$J_N$".

The trust generator 302 may receive the user-item matrix 312 as an input and generate a user-user trust matrix 314 for the second domain as an output. The user-user trust matrix 314 may correspond to the second correlation information associated with the second set of users ("$U_1$", "$V_2$", ..., and "$V_N$"). The circuitry 202 may determine, via the trust generator 302, a trust score of the user "$U_1$" with respect to each of the users "$V_2$", ... "$V_N$", based on the rating information. The first row of the user-user trust matrix 314 may include the trust score of the user "$U_1$" with respect to each of the users "$U_1$", ... "$V_N$". For example, the trust score of the user "$U_1$" with respect to the user "$V_2$" may be determined based on co-positive ratings of one or more items of the set of items "$J_1$", ... "$J_N$", by the user "$U_1$" and "$V_2$". The co-positive ratings of the one or more items of the set of items by the users "$U_1$" and "$V_2$" may be obtained from the first and second rows, respectively, of the user-item matrix 312. The trust score of the user "$U_1$" with respect to the user "$V_2$" may be determined further based on ratings of one or more items of the set of items "$J_1$", ... "$J_N$" by the user "$V_2$". The ratings of the one or more items of the set of items by $V_2$ may be obtained from the second row of the user-item matrix 312.

In accordance with an embodiment, the circuitry 202 may be configured to determine second neighborhood information 316 associated with the user "$U_1$" (i.e., the user 116) based on the second correlation information (i.e., the user-user trust matrix 314). The determined second neighborhood information 316 may be indicative of users of the second set of users correlated to the user "$U_1$". The circuitry 202 may determine the users, that are correlated to the user "$U_1$", based on a comparison of the trust score of the user "$U_1$" (with respect to each of the users "$V_2$", ... "$V_N$") with the predefined threshold. The circuitry 202 may obtain the trust score of the user "$U_1$" with respect to each of the users "$V_2$", ... "$V_N$", based on the first row of the user-user trust matrix 314. The comparison may indicate that the trust score of the user "$U_1$" with respect to each user correlated to the user "$U_1$" may be greater than the predefined threshold. The users of the second set of users correlated to the user "$U_1$" (i.e., the first user or the user 116) may correspond to the plurality of third users of the second set of users or neighbors of "$U_1$" in the second domain. Thus, the second correlation information (i.e., the user-user trust matrix 314) may include the second neighborhood information 316 and the association between the first user (i.e., the user "$U_1$") and the plurality of third users.

The circuitry 202 may be further configured to generate a second vector 318 based on application of the GAT model 108 on the second neighborhood information 316. The second vector 318 may be indicative of a trust embedding of the user "$U_1$" (i.e., the first user or the user 116) with respect to the second set of users "$U_1$", "$V_2$", ... and "$V_N$". The GAT model 108 may include nodes associated with the user "$U_1$" and the users of the second set of users correlated to the user "$U_1$" (i.e., neighbors of the user "$U_1$" in the second domain). For example, the users "$V_2$", "$V_3$", "$V_4$", and "$V_5$", may be correlated to the user "$U_1$". Thus, the GAT model 108 may include 5 nodes associated with the users "$U_1$", "$V_2$", "$V_3$", "$V_4$", and "$V_5$". The nodes of the GAT model 108 may represent a user embedding associated with the user "$U_1$" and user embeddings associated with the neighbors of the user "$U_1$" in the second domain (i.e., the users "$V_2$", "$V_3$", "$V_4$", and "$V_5$"). The user embedding associated with the user "$U_1$" (i.e., the first user) may correspond to a third vector 320. A user embedding associated with a user, who is a neighbor of the first user "$U_1$" in the second domain (i.e., the users "$V_2$", "$V_3$", "$V_4$", and "$V_5$"), may be generated based on features, such as, particulars (for example, age and gender) of the user, demographic information associated with the user, an item consumption history of the user (for example, for the items "$J_1$", ... , "$J_N$"), or an item consumption pattern associated with the user (for example, for the items "$J_1$", ... , "$J_N$").

The circuitry 202 may associate, via the GAT model 108, a first weight to each of the 5 nodes of the GAT model 108.

The GAT model 108 may associate the first weight to each of the nodes associated with the users "$V_2$", "$V_3$", "$V_4$", and "$V_5$", via an attention mechanism. The first weight associated with a node may be based on a degree of correlation between the user "$U_1$" and a corresponding user (for e.g., "$V_2$", "$V_3$", "$V_4$", or "$V_5$") associated with the node. The degree of correlation may be based on (for example, directly proportional) to the trust score of the user "$U_1$" with respect to each of the users "$V_2$", "$V_3$", "$V_4$", and "$V_5$". The circuitry 202 may further determine, via the GAT model 108, a weighted vector for each of the nodes associated with the users "$V_2$", "$V_3$", "$V_4$", and "$V_5$". The weighted vector for a node may be based on the first weight associated with the node and a user embedding represented by the node. For example, the weighted vector for the node associated with the user "$V_2$" may be based on the first weight associated with the node and the user embedding associated with the user "$V_2$" (represented by the node). Similarly, the circuitry 202 may determine, via the GAT model 108, the weighted vector for each of the nodes associated with the users "$V_3$", "$V_4$", and "$V_5$". Thus, four weighted vectors may be determined that correspond to the nodes associated with the users "$V_2$", "$V_3$", "$V_4$", and "$V_5$".

In accordance with an embodiment, the circuitry 202 may concatenate the weighted vectors of the nodes associated with the users "$V_2$", "$V_3$", "$V_4$", and "$V_5$", to generate the second vector 318. In accordance with another embodiment, the circuitry 202 may compute an average of the weighted vectors of the nodes associated with the users "$V_2$", "$V_3$", "$V_4$", and "$V_5$", to generate the second vector 318.

The circuitry 202 may be further configured to generate recommendations, by use of the recommendation model 110, based on the first vector 310, the second vector 318, and the third vector 320. In accordance with an embodiment, the circuitry 202 may be configured to determine, via the recommendation model 110, a second weight associated with the second vector 318. The second weight may be determined based on a first count of the first set of users ("$U_1$", ... "$U_N$"), a second count of the second set of users ("$U_1$", ... "$V_N$"), and a third count of users common to the first set of users and the second set of users. The second weight may indicate a degree of relevancy of the auxiliary domain (i.e., the second domain) with respect to the target domain (i.e., the first domain). The circuitry 202 may be configured to generate a weighted second vector based on the second vector 318 and the determined second weight.

The third vector 320 may be representative of a user embedding associated with the first user "$U_1$" in the first domain. In some embodiments, the third vector 320 may be generated based on personal particulars of the first user (i.e., the user "$U_1$") such as age of the first user, gender of the first user, or demographic information associated with the first user. In some other embodiments, the recommendation model 110 may generate the third vector 320 based on the personal particulars of the first user, demographic information associated with the first user, item consumption history of the first user (for example, for the items "$I_1$", ... , "$I_M$"), or item consumption pattern associated with the first user (for example, for the items "$I_1$", ... , "$I_M$"). The third vector 302 may be generated prior to or during initiation of consumption of the set of items (for example, for the items "$I_1$", ... , "$I_M$") by the first user.

The circuitry 202 may generate an updated user embedding associated with the first user (i.e., the user "$U_1$") in the first domain, based on the application of the recommendation model 110 on the first vector 310, the weighted second vector, and the third vector 320. In accordance with an embodiment, the recommendation model 110 may generate the updated user embedding based on an aggregation of the first vector 310, the weighted second vector, and the third vector 320. In accordance with another embodiment, the recommendation model 110 may generate the updated user embedding based on concatenation of the first vector 310, the weighted second vector, and the third vector 320. The recommendation model 110 may generate a recommendation that includes one or more items 322 of the set of items (for example, for the items "$I_1$", ..., "$I_M$"), based on the updated user embedding associated with the first user.

The circuitry 202 may be further configured to render, via the display device 210, the one or more recommend items 322 included in the generated recommendation. In an embodiment, the trust-based embeddings may be updated periodically over a pre-defined time-period specified by the user 116. Accordingly, the circuitry 202 may update the recommendations periodically based on the periodic update of the trust-based embeddings. The updated recommendations may be rendered via the display device 210.

The electronic device 102 may generate trust-based embeddings (for example, the first vector 310 and the second weighted vector) based on determined correlation between users across a target domain (for example, the first domain) and one or more auxiliary domains (for example, the second domain). The trust-based embeddings may be used to update or modify existing user embeddings to generate information-rich user embeddings. The recommendation model 110 may generate a modified user embedding associated with a target user to determine users that may be relevant to the target user and items of the target domain that may be similar to items (of the target domain) that have been previously consumed by the target user. The relevancy of a user with respect to the target user may be determined based on co-positive ratings of items by the user and the target user across multiple domains. Based on the determination, the recommendation model 110 may recommend items that have been consumed by the relevant users. Further, the recommended items associated with the target domain may be similar to the items that have been consumed by the target user in the target domain. Thus, the relevancy of recommendations may be increased based on usage of the modified user embedding.

The recommendation model 110 may leverage trust between users across multiple domains to overcome issues, such as, "data sparsity" or "cold start". The recommendation model 110 may overcome "data sparsity" or "cold start" in the target domain, via usage of the trust-based embeddings of the target user with respect to a set of users in the one or more auxiliary domains. The recommendation model 110 may be used in applications such as OTT platforms (that includes domains such as movies, shows, sports, and so on), e-commerce platforms (that includes domains such as music, books, groceries, electronics, and so on), machine learning platforms (that includes domains, such as artificial intelligence, natural language processing, web-designing, and so on), or red-flagging users in social media (for example, a user may be red-flagged at a first social media platform based on an accounted misbehavior by the user at a second social media platform), and so on.

It should be noted that the scenario 300 of FIG. 3 is for exemplary purposes and should not be construed to limit the scope of the disclosure.

Figure 4:
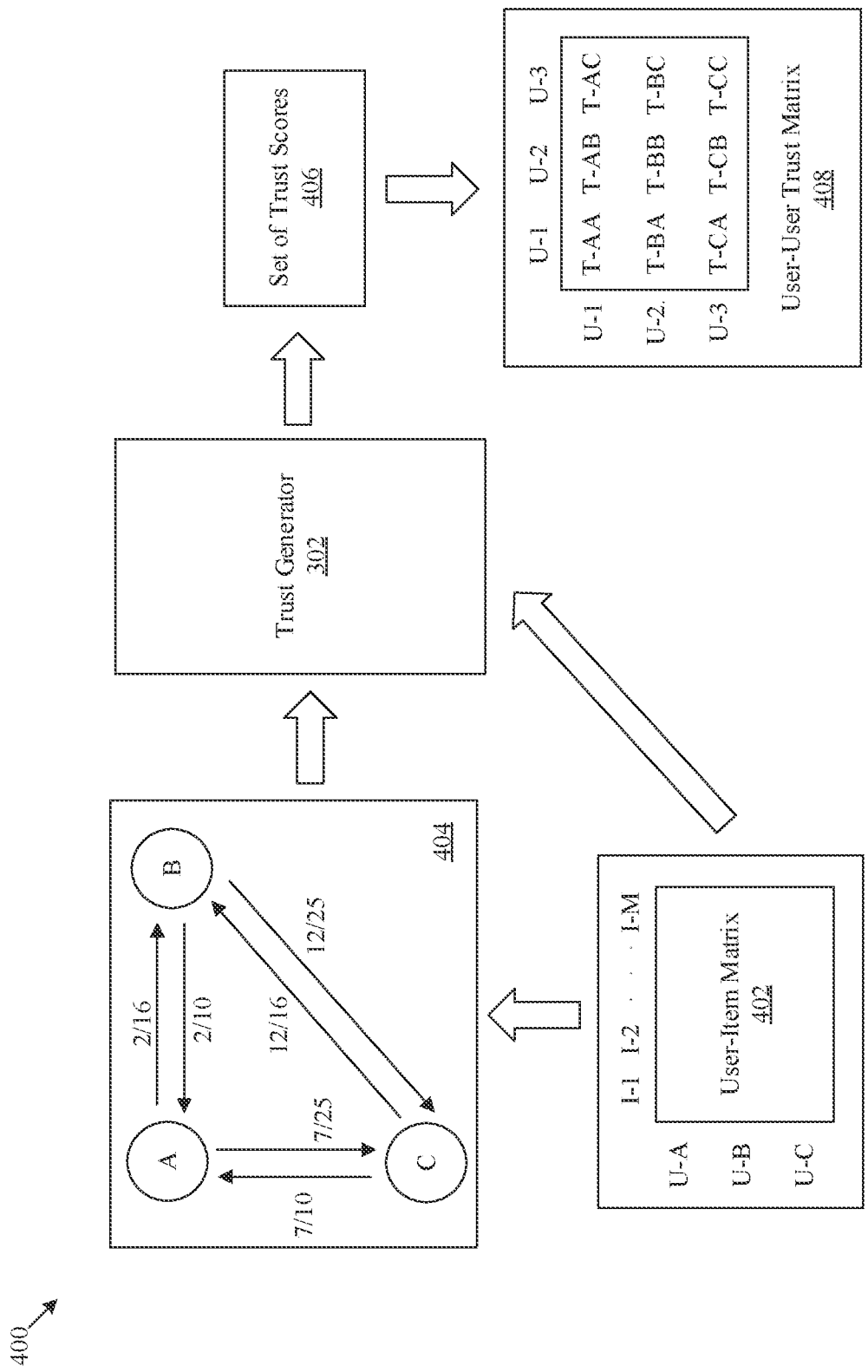
FIG. 4 is a diagram that illustrates an exemplary scenario for generation of correlation information for a set of users based on rating information associated with the set of users for a set of items associated with a domain, in accordance with an embodiment of the disclosure.

FIG. 4 is a diagram that illustrates an exemplary scenario for generation of correlation information for a set of users based on rating information associated with the set of users for a set of items associated with a domain, in accordance with an embodiment of the disclosure. FIG. 4 is explained in conjunction with elements from FIG. 1, FIG. 2, and FIG. 3. With reference to FIG. 4, there is shown an exemplary scenario 400. In the exemplary scenario 400 there is shown the trust generator 302 of FIG. 3, a user-item matrix 402, a graph 404, a set of trust scores 406, and a user-user trust matrix 408. The circuitry 202 may receive the user-item matrix 402 and generate the graph 404 based on the user-item matrix 402. The circuitry 202 may further determine, via the trust generator 302, the set of trust scores 406 of each user of a set of users with respect to each of the other users of the set of users. The circuitry 202 may further generate the user-user trust matrix 408 based on the determined trust scores 406.

In accordance with an embodiment, the circuitry 202 may be configured to receive rating information associated with a set of users (for example, a user "A", a user "B", and a user "C") for a set of items (for example, items "$I_1$", ..., "$I_M$") associated with a domain. The circuitry 202 may be configured to generate the user-item matrix 402 based on the received rating information. The first row of the user-item matrix 402 may correspond to rating information associated with the user "A" for the set of items "$I_1$", ..., "$I_M$". The second row of the user-item matrix 402 may correspond to rating information associated with the user "B" for the set of items "$I_1$", ..., "$I_M$". Similarly, the third row of the user-item matrix 402 may correspond to rating information associated with the user "C" for the set of items "$I_1$", ..., "$I_M$".

The circuitry 202 may be further configured to generate the graph 404 based on the user-item matrix 402. The graph 404 may include three nodes that represent the set of users. The edges connecting the nodes of the graph are indicative of count of co-positive ratings of the set of items "$I_1$", ..., "$I_M$", by the users, represented by the nodes connected by the edges. For example, the circuitry 202 may determine, based on the first row of the user-item matrix 402, that the user "A" had rated 10 items of the set of items. Similarly, the circuitry 202 may determine that the user "B" had rated 16 items of the set of items, based on the second row of the user-item matrix 402; and the user "C" had rated 25 items of the set of items, based on the third row of the user-item matrix 402.

The circuitry 202 may be further configured to determine, based on a comparison of the first row and the second row of the user-item matrix 402, that the user "B" had rated 2 items out of the 10 items rated by the user "A" and that the user "A" had rated 2 items out of the 16 items rated by the user "B". Therefore, a count of co-positive positive ratings for the set of items "$I_1$", ..., "$I_M$" by the users "A" and "B" (indicated by the edges that connect the nodes representative of the users A and B), may be 2. Similarly, the circuitry 202 may determine, based on a comparison of the first row and the third row of the user-item matrix 402, that the user "C" had rated 7 items out of the 10 items rated by the user "A" and that the user "A" had rated 7 items out of the 25 items rated by the user "C". Therefore, a count of co-positive positive ratings for the set of items "$I_1$", ..., "$I_M$", by the users "A" and "C" (indicated by the edges that connect the nodes representative of users "A" and "C"), may be 7. Further, the circuitry 202 may determine, based on a comparison of the second row and the third row of the user-item matrix 402, that the user "C" had rated 12 items out of the 16 items rated by the user "B" and the user "B" had rated 12 items out of the 25 items rated by the user "C". Therefore, a count of co-positive positive ratings for the set of items "$I_1$", ..., "$I_M$", by the users "B" and "C", (indicated by the edges that connect the nodes representative of users "B" and "C"), may be 12.

The circuitry 202 may be further configured to determine the set of trust scores 406 based on the user-item matrix 402 and the graph 404. The trust score of the user "A" with respect to the user "A" (i.e., "$T_{AA}$"), the trust score of the user "B" with respect to the user "B" (i.e., "$T_{BB}$"), and the trust score of the user "C" with respect to the user "C" (i.e., "$T_{CC}$") may be 1. That is, the trust score of a user with respect to the same user may be 1. The trust score of the user "A" with respect to the user "B" (i.e., "$T_{AB}$") may be determined based on co-positive ratings for one or more items of the set of items "$I_1$", ..., "$I_M$" received from the user "A" and the user "B", and the rating received from the user "B" for one or more items of the set of items "$I_1$", ..., "$I_M$". Similarly, the trust score of the user "B" with respect to the user "A" (i.e., "$T_{BA}$") may be determined based on co-positive ratings for one or more items of the set of items "$I_1$", ..., "$I_M$" received from the user "B" and the user "A", and the rating received from the user "A" for one or more items of the set of items "$I_1$", ..., "$I_M$".

For example, the user "A" and the user "B" may positively rate a fourth item and a sixth item of the the set of items "$I_1$", ..., "$I_M$" (as the count of co-positive positive ratings for the set of items "$I_1$", ..., "$I_M$", by users "A" and "B" is 2). In such case, the trust score of the user "A" with respect to the user "B" may be determined based on the following expression (1):

$$T_{AB} = \frac{r_{A4} * r_{B4} + r_{A6} * r_{B6}}{\sum_{i \in index \ of \ items \ rated \ by \ user \ B} r_{Bi}} \quad (1)$$

Similarly, the trust score of the user "B" with respect to the user "A" may be determined based on the following expression (2):

$$T_{BA} = \frac{r_{B4} * r_{A4} + r_{B6} * r_{A6}}{\sum_{i \in index \ of \ items \ rated \ by \ user \ A} r_{Ai}} \quad (2)$$

Here, $r_{Ai}$ may denote rating information associated with the user "A" for an $i^{th}$ item of the set of items "$I_1$", ..., "$I_M$", and "$r_{Bi}$" may denote rating information associated with the user "B" for the $i^{th}$ item of the set of items "$I_1$", ..., "$I_N$". The circuitry 202 may determine "$r_{Ai}$" from the first row of the user-item matrix 402. The circuitry 202 may determine "$r_{Bi}$" from the second row of the user-item matrix 402. The denominator of the fraction "$T_{AB}$" may include 16 ratings, as the user "B" had rated 16 items amongst in the items "$I_1$", ..., "$I_M$". The denominator of the fraction "$T_{BA}$" may include 10 ratings, as the user "A" had rated 10 items amongst the items "$I_1$", "$I_M$".

The circuitry 202 may be configured to determine the trust score of the user "A" with respect to the user "C" (i.e., "$T_{AC}$") based on co-positive ratings for one or more items of the set of items "$I_1$", ..., "$I_M$" received from the user "A" and the user "C", and the rating received from the user "C" for one or more items of the set of items "$I_1$", ..., "$I_M$". Similarly, the trust score of the user "C" with respect to the user "A" (i.e., "$T_{CA}$") may be determined based on co-positive ratings for one or more items of the set of items "$I_1$", ..., "$I_M$" received from the user "C" and the user "A", and the rating received from the user "A" for one or more items of the set of items "$I_1$", "$I_M$".

The trust score of the user "A" with respect to the user "C" (i.e., "$T_{AC}$") may be determined based on the following expression (3):

$$T_{AC} = \frac{\sum_{i \in index \ of \ items \ rated \ by \ users \ A \ and \ C} r_{Ai} * r_{Ci}}{\sum_{i \in index \ of \ items \ rated \ by \ user \ C} r_{Ci}} \quad (3)$$

Similarly, the trust score of the user "C" with respect to the user "A" (i.e., "$T_{CA}$") may be determined based on the following expression (4):

$$T_{CA} = \frac{\sum_{i \in index \ of \ items \ rated \ by \ users \ A \ and \ C} r_{Ci} * r_{Ai}}{\sum_{i \in index \ of \ items \ rated \ by \ user \ A} r_{Ai}} \quad (4)$$

The circuitry 202 may determine "$r_{Ai}$" from the first row of the user-item matrix 402. The circuitry 202 may determine "$r_{Ci}$" from the third row of the user-item matrix 402. The numerators of the fractions "$T_{AC}$" and "$T_{CA}$" may include 7 terms since count of co-positive positive ratings for the set of items "$I_1$", ..., "$I_M$" by the users "A" and "C" is 7. The denominator of the fraction "$T_{AC}$" may include 25 terms as the user "C" had rated 25 items amongst in the items "$I_1$", ..., "$I_M$". The denominator of the fraction "$T_{CA}$" may include 10 terms, as user "A" had rated 10 items amongst in the items "$I_1$", ..., "$I_M$".

The circuitry 202 may be configured to determine the trust score of the user "B" with respect to the user "C" (i.e., "$T_{BC}$") based on co-positive ratings for one or more items of the set of items "$I_1$", ..., "$I_M$", received from the user "B" and the user "C", and the rating received from the user "C" for one or more items of the set of items "$I_1$", ..., "$I_M$". Similarly, the trust score of the user "C" with respect to the user "B" (i.e., "$T_{CB}$") may be determined based on co-positive ratings for one or more items of the set of items "$I_1$", ..., "$I_M$", received from the user "C" and the user "B", and the rating received from the user "B" for one or more items of the set of items "$I_1$", ..., "$I_M$".

The trust score of the user "B" with respect to the user "C" (i.e., "$T_{BC}$") may be determined based on the following expression (5):

$$T_{BC} = \frac{\sum_{i \in index \ of \ items \ rated \ by \ users \ B \ and \ C} r_{Bi} * r_{Ci}}{\sum_{i \in index \ of \ items \ rated \ by \ user \ C} r_{Ci}} \quad (5)$$

Similarly, the trust score of the user "C" with respect to the user "B" (i.e., "$T_{CB}$") may be determined based on the following expression (6):

$$\left( T_{CB} = \frac{\sum_{i \in index \ of \ items \ rated \ by \ users \ C \ and \ B} r_{Ci} * r_{Bi}}{\sum_{i \in index \ of \ items \ rated \ by \ user \ B} r_{Bi}} \right) \quad (6)$$

The circuitry 202 may determine "$r_{Bi}$" from the second row of the user-item matrix 402. The circuitry 202 may determine "$r_{Ci}$" from the third row of the user-item matrix 402. The numerator and denominator of the fractions "$T_{BC}$"

and "$T_{CB}$" may include 12 terms since count of co-positive positive ratings for the set of items "$I_1$", ..., "$I_M$", by the users "B" and "C" is 12. The denominator of the fraction "$T_{BC}$" may include 25 terms as the user "C" had rated 25 items amongst the items "$I_1$", ..., "$I_M$". The denominator of the fraction "$T_{CB}$" may include 16 terms, as the user B had rated 16 items amongst the items "$I_1$", ..., "$I_M$".

The circuitry 202 may be further configured to generate the user-user trust matrix 408 based on the set of trust scores 406. The user-user trust matrix 408 may correspond to the correlation information associated with the set of users (i.e., the user "A", the user "B", and the user "C"). The first row of the user-user trust matrix 408 may include the trust score of the user "A" with respect to each of the user "A" (i.e., "$T_{AA}$"), the user "B" (i.e., "$T_{AB}$"), and the user "C" (i.e., "$T_{AC}$"). The second row of the user-user trust matrix 408 may include the trust score of the user "B" with respect to each of the user "A" (i.e., "$T_{BA}$"), the user "B" (i.e., "$T_{BB}$"), and the user "C" (i.e., "$T_{BC}$"). The third row of the user-user trust matrix 408 may include the trust score of the user "C" with respect to each of the user "A" (i.e., "$T_{CA}$"), the user "B" (i.e., "$T_{CB}$"), and the user "C" (i.e., "$T_{CC}$").

It should be noted that the scenario 400 of FIG. 4 is for exemplary purposes and should not be construed to limit the scope of the disclosure.

Figure 5:
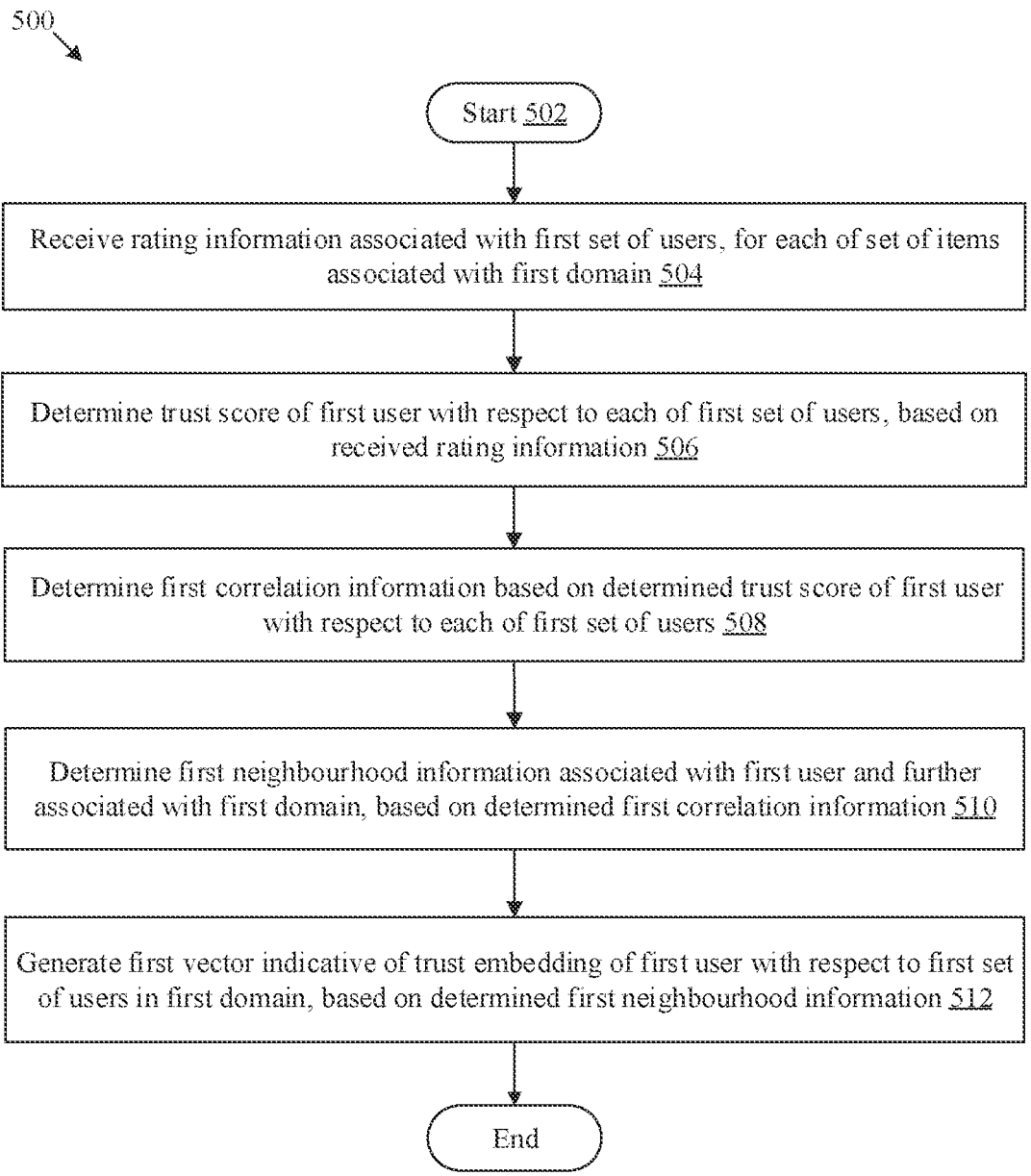
FIG. 5 is a flowchart that illustrates operations for an exemplary method for generation of a vector indicative of a trust embedding of a user in a target domain, in accordance with an embodiment of the disclosure.

FIG. 5 is a flowchart that illustrates operations for an exemplary method for generation of a vector indicative of a trust embedding of a user in a target domain, in accordance with an embodiment of the disclosure. FIG. 5 is explained in conjunction with elements from FIG. 1, FIG. 2, FIG. 3, and FIG. 4. With reference to FIG. 5, there is shown a flowchart 500. The operations from 502 to 512 may be implemented by any computing system, such as, by the electronic device 102 of FIG. 1. The operations may start at 502 and may proceed to 504.

At 504, rating information associated with the first set of users, for a set of items associated with the first domain may be received. In at least one embodiment, the circuitry 202 may be configured to receive the rating information associated with the first set of users (for example, the users "$U_1$", ..., "$U_5$"), for the set of items (for example "$I_1$", ... "$I_6$") associated with the first domain (for example, the target domain). For example, the received rating information may include first ratings associated with the user "$U_1$" (for items, such as, "$I_1$", "$I_3$", "$I_4$", and "$I_6$"), second ratings associated with the user "$U_2$" (for items, such as, "$I_2$", "$I_4$", and "$I_5$"), and third ratings associated with the user "$U_3$" (for items, such as, "$I_2$", "$I_3$", "$I_5$", and "$I_6$"). The received rating information may further include fourth ratings associated with the user "$U_4$" (for items, such as, "$I_1$", "$I_2$", "$I_5$", and "$I_6$") and fifth ratings associated with the user "$U_5$" (for items, such as, "$I_1$", "$I_4$", and "$I_5$"). Each user of the first set of items may positively rate the one or more items.

At 506, a trust score of the first user, with respect to each of the first set of users, may be determined based on the received rating information. In at least one embodiment, the circuitry 202 may be configured to determine the trust score of the first user (i.e., the user 116 or the user "$U_1$") with respect to each user of the first set of users (i.e., the users "$U_1$", ..., "$U_5$") based on the received rating information. The trust score of a user (e.g., the user "$U_1$") with respect to the same user (i.e., the user "$U_1$") may be 1. Thus, "$T_{11}$" may be 1. In accordance with an embodiment, the circuitry 202 may determine the trust score of the first user "$U_1$" with respect to other users of the first set of users based on co-positive ratings of one or more items of the set of items (i.e., "$I_1$", ..., "$I_6$") by the first user "$U_1$" and the corresponding other user (i.e., "$U_2$", "$U_3$", "$U_4$", or "$U_5$") of the first set of users. The trust score of the user "$U_1$" with respect to each of the users "$U_2$", "$U_3$", "$U_4$", or "$U_5$" may be determined further based on ratings of one or more items of the set of items by each of the users "$U_2$", "$U_3$", "$U_4$", or "$U_5$".

For example, the trust score (i.e., "$T_{12}$") of the user "$U_1$" with respect to the user "$U_2$" may be determined based on rating associated with the users "$U_1$" and "$U_2$" for the item "$I_4$" (i.e., the commonly rated item), and ratings associated with the user "$U_2$" for the items "$I_2$", "$I_4$", and "$I_5$" (i.e., the items only rated by the user "$U_2$" and not by the user "$U_1$"). Similarly, trust score (i.e., "$T_{13}$") of the user "$U_1$" with respect to the user "$U_3$" may be determined based on rating associated with the users "$U_1$" and "$U_3$" for the commonly rated items "$I_3$" and "$I_6$", and ratings associated with the user "$U_3$" for the items "$I_2$", "$I_3$", "$I_5$", and "$I_6$" (i.e., the items only rated by the user "$U_3$" and not by the user "$U_1$"), and so on.

At 508, first correlation information may be determined based on the determined trust score of the first user with respect to each of the first set of users. In at least one embodiment, the circuitry 202 may be configured to determine the first correlation information based on the determined trust score of the first user (i.e., the user 116 or the user "$U_1$") with respect to each user of the first set of users (i.e., "$U_1$", ... "$U_N$"). For example, the first correlation information may correspond to a set of trust scores "$T_{11}$", "$T_{12}$", "$T_{13}$", "$T_{14}$", and "$T_{15}$". The first correlation information may be determined further based on "$T_{im}$", where 'i' ∈ (2, 3, 4, 5} and 'i' ≠ 'm' (since $T_{22}=T_{33}=T_{44}=T_{55}=1$).

At 510, first neighborhood information associated with the first user and further associated with the first domain, may be determined based on the determined first correlation information. In at least one embodiment, the circuitry 202 may be configured to determine the first neighborhood information associated with the first user (i.e., the user 116 or $U_1$) and further associated with the first domain (i.e., the target domain) based on the determined first correlation information. In at least one embodiment, the circuitry 202 may be configured to compare the determined trust score (i.e., "$T_{12}$", "$T_{13}$", "$T_{14}$", or "$T_{15}$") of the first user (i.e., the user 116 or the user "$U_1$") and a predefined threshold. The circuitry 202 may be configured to determine the first neighborhood information based on the comparison.

For example, each of the determined trust scores (i.e., "$T_{12}$", "$T_{13}$", "$T_{14}$", or "$T_{15}$") may be compared with the predefined threshold. The trust score (i.e., "$T_{12}$") of the first user "$U_1$" with respect to the user "$U_2$" and the trust score (i.e., "$T_{14}$") of the first user "$U_1$" with respect to the user "$U_4$" may be greater than the predefined threshold. In accordance with an embodiment, the first neighborhood information may be indicative of users of the first set of users that may be correlated to the first user (i.e., the user 116 or the user "$U_1$"). For example, the circuitry 202 may determine, based on the comparison, that the users "$U_2$" and "$U_4$" may be correlated to the first user (i.e., the user "$U_1$") in the first domain. In such case, the users "$U_2$" and "$U_4$" may correspond to the plurality of second users of the first set of users (i.e., "$U_1$", ... "$U_5$") or neighbors of the first user "$U_1$" in the first domain.

At 512, a first vector indicative of a trust embedding of the first user with respect to the first set of users in the first domain may be generated, based on the determined first neighborhood information. In at least one embodiment, the circuitry 202 may be configured to generate the first vector indicative of the trust embedding of the first user (i.e., the user 116 or the user "$U_1$") with respect to the first set of users (i.e., "$U_1$", ... "$U_N$") in the first domain (i.e., the target domain) based on the determined first neighborhood information. The circuitry 202 may be configured to obtain user embeddings associated with the users correlated to the user "$U_1$" or neighbors of the user "$U_1$". For example, the circuitry 202 may obtain user embeddings associated with the users "$U_2$" and "$U_4$". The circuitry 202 may be configured to concatenate the user embeddings associated with the users "$U_2$" and "$U_4$" to generate the first vector indicative of a trust embedding of the user "$U_1$" in the first domain.

In some embodiments, the circuitry 202 may be configured to select a predefined number of users amongst the first set of users, based on the first correlation information, as neighbors of the first user "$U_1$". The trust score of "$U_1$" with respect to each of the predefined number of users may be greater than the predefined threshold. The circuitry 202 may generate the first vector based on concatenation of a predefined number of vectors that are representative of a user embedding associated with the predefined number of users. For example, the predefined number of users may correspond to 2 users, viz., the users "$U_2$" and "$U_4$", since trust score of the user "$U_1$" with respect to each of the users "$U_2$" and "$U_4$" may be greater than the predefined threshold. The circuitry 202 may concatenate user embeddings (i.e., the corresponding vectors) associated with the users "$U_2$" and "$U_4$" to determine the first vector. However, there may be scenarios in which the trust score of the first user "$U_1$" with respect to two or more users of the first set of users may be equal. Further, a count of users, with respect to whom the trust score of the first user "$U_1$" is greater than the predefined threshold, may be greater than the predefined number of users. For example, the trust score of the first user "$U_1$" with respect to each of the users, such as, "$U_2$", "$U_4$", and "$U_5$", may be greater than the predefined threshold (in case, the predefined number of users to be selected as neighbors of the first user "$U_1$" is 2). Further, the trust score of the first user "$U_1$" with respect to the user "$U_4$" may be equal to the trust score of the first user "$U_1$" with respect to the user "$U_5$". In this scenario, the circuitry 202 may select one of the two users (i.e., the users "$U_4$" or "$U_5$") such that 2 users are selected as neighbors. The selection of one of the two users may be based on a similarity between the user and the first user "$U_1$" in terms of various factors such as, age, demographic information, gender, and so on. For example, the circuitry 202 may select the user "$U_4$", in a case where the age of the user "$U_4$" is closer to the age of the first user "$U_1$", as compared to the age of the user "$U_5$". If the age of the users "$U_4$" and "$U_5$" are identical, the selection of one of the two users may be based on other factors, such as, the demographic information, and gender, and so on. Control may pass to end.

Although the flowchart 500 is illustrated as discrete operations, such as 504, 506, 508, 510, and 512, the disclosure is not so limited. Accordingly, in certain embodiments, such discrete operations may be further divided into additional operations, combined into fewer operations, or eliminated, depending on the implementation without detracting from the essence of the disclosed embodiments.

Figure 6:
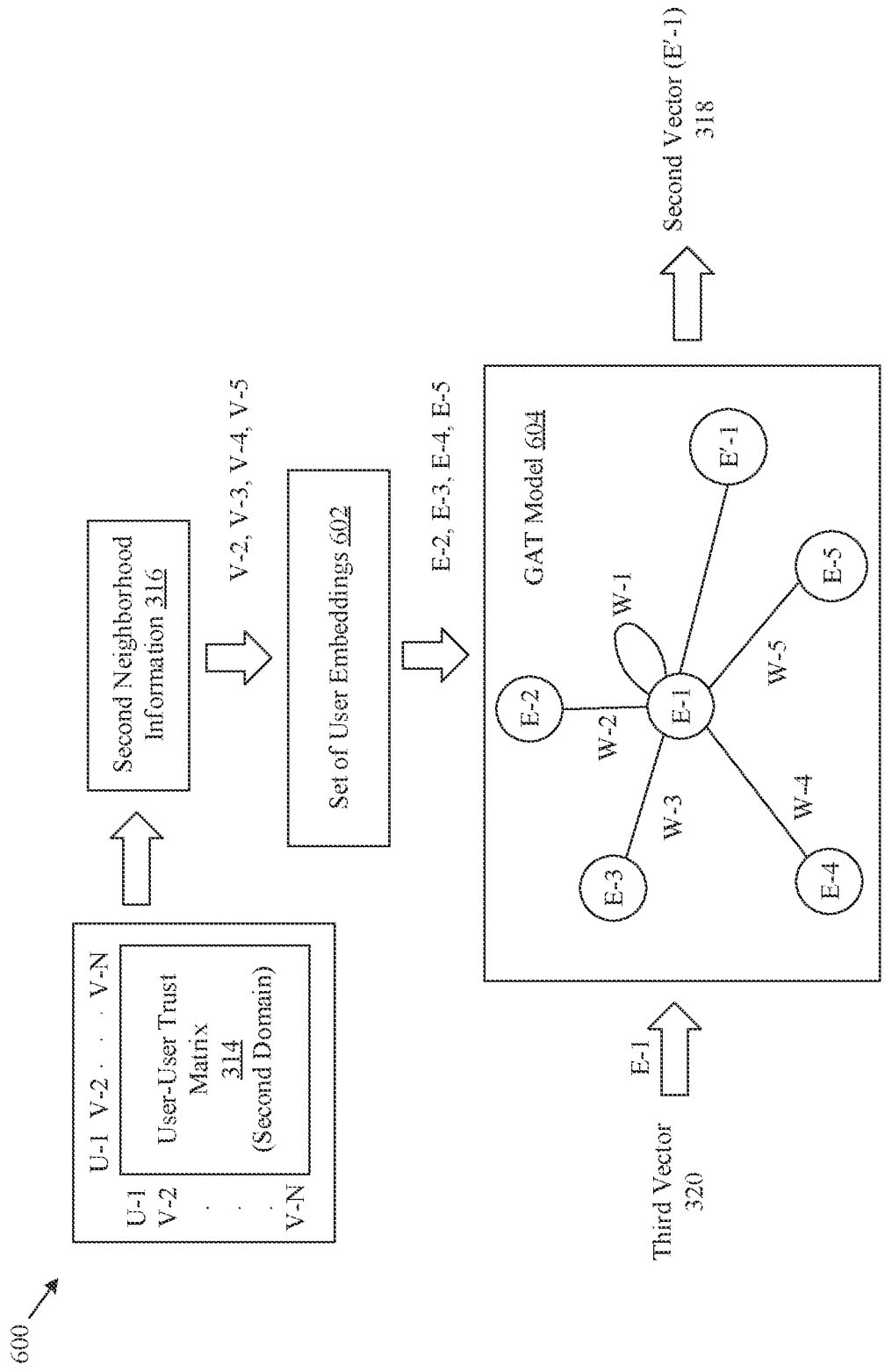
FIG. 6 is a diagram that illustrates an exemplary scenario for generation of a vector indicative of a trust embedding of a user in an auxiliary domain based on a Graph Attention Network (GAT) model, in accordance with an embodiment of the disclosure.

FIG. 6 is a diagram that illustrates an exemplary scenario for generation of a vector indicative of a trust embedding of a user in an auxiliary domain, based on a Graph Attention Network (GAT) model, in accordance with an embodiment of the disclosure. FIG. 6 is explained in conjunction with elements from FIG. 1, FIG. 2, FIG. 3, FIG. 4, and FIG. 5. With reference to FIG. 6, there is shown an exemplary scenario 600. In the exemplary scenario 600, there is shown the user-user trust matrix 314 (for the second domain) of FIG. 3, the second neighborhood information 316 of FIG. 3, a set of user embeddings 602, the third vector 320 of FIG. 3, a GAT model 604, and the second vector 318 of FIG. 3. The GAT model 604 may be an exemplary implementation the GAT model 108 of FIG. 1. The circuitry 202 may be configured to determine the second vector 318 based on application of the GAT model 604 on the set of user embeddings 602 (which may be represented by nodes of the GAT model 604).

In accordance with an embodiment, the circuitry 202 may be configured to generate the user-user trust matrix 314 based on the user-item matrix 312. The user-user trust matrix 314 may correspond to the second correlation information associated with the second set of users ("$U_1$", "$V_2$", ..., and "$V_N$"). The circuitry 202 may be configured to determine the second neighborhood information 316 associated with the first user (i.e., the user 116 or the user "$U_1$") and further associated with the second domain, based on the second correlation information. The determined second neighborhood information 316 may be indicative of users of the second set of users correlated to the first user (i.e., the user 116 or the user "$U_1$"). For example, the users "$V_2$", "$V_3$", "$V_4$", and "$V_5$", may be correlated to the first user "$U_1$". The users correlated to first user "$U_1$" in the second domain may correspond to the plurality of third users of the second set of users or neighbors of the first user "$U_1$" in the second domain.

The circuitry 202 may be further configured to obtain the set of user embeddings 602. The set of user embeddings 602 may include user embeddings associated with neighbors of the first user (i.e., the user 116 or the user "$U_1$") in the second domain or the plurality of third users in the second domain. The circuitry 202 may obtain the set of user embeddings 602 based on the second neighborhood information 316. The circuitry 202 may obtain the user embeddings associated with the user "$V_2$", "$V_3$", "$V_4$", and "$V_5$" (i.e., the neighbors of the first user "$U_1$" in the second domain). The obtained user embeddings may be represented as user embeddings "$E_2$", "$E_3$", "$E_4$", and "$E_5$". The user embedding (i.e., the third vector 320) associated with the first user "$U_1$" may be represented as a user embedding "$E_1$". The GAT model 604 may receive the user embedding "$E_1$" (i.e., the third vector 320) and the user embeddings "$E_2$", "$E_3$", "$E_4$", and "$E_5$", as inputs.

The GAT model 108 may include nodes that may be representative of the user embeddings "$E_1$", "$E_2$", "$E_3$", "$E_4$", and "$E_5$". In accordance with an embodiment, the circuitry 202 may be configured to determine, via application of the GAT model 604, a first weight associated with each of plurality of vectors (i.e., user embeddings) for each corresponding user of the plurality of third users (i.e., the users "$V_2$", "$V_3$", "$V_4$", or "$V_5$"), based on the determined second correlation information (i.e., the user-user trust matrix 314). The plurality of vectors may correspond to the plurality of user embeddings "$E_2$", "$E_3$", "$E_4$", and "$E_5$". The first weight associated with a user embedding (associated with a user correlated to the first user "$U_1$" in the second domain) may be based on (for example, directly proportional) to the trust score of the first user "$U_1$" with respect to a user associated with the user embedding. For example, the first weight associated with the user embedding "$E_2$" (associated with the user "$V_2$") may be based on (for example, directly proportional to) the trust score of the first user "$U_1$" with respect to the user "$V_2$". Similarly, the first weight associated with the user embedding "$E_3$ (associated with the user "$V_3$") may be directly proportional to the trust score of the first user "$U_1$" with respect to the user "$V_3$", and so on. The trust score of the first user "$U_1$" with respect to each of the users "$V_2$", "$V_3$", "$V_4$", or "$V_5$" may be obtained from the first row of the user-user trust matrix 314. Thus, the circuitry 202 may associate the first weight to each of the user embeddings "$E_2$", "$E_3$", "$E_4$", and "$E_5$".

The circuitry 202 may be further configured to determine a plurality of weighted vectors based on the determined first weight and each corresponding vector (i.e., the user embedding) of the plurality of vectors (i.e., "$E_2$", "$E_3$", "$E_4$", and "$E_5$"). For example, the circuitry 202 may determine 4 weighted vectors. The 4 weighted vectors may be associated with the nodes that represent the user embeddings "$E_2$", "$E_3$", "$E_4$", and "$E_5$", respectively. For example, the weighted vector associated with the node representative of the user embedding "$E_2$" may be determined based on the first weight associated with user embedding "$E_2$", and the vector representation of the user embedding "$E_2$" itself. The weighted vector associated with the node representative of the user embedding "$E_3$" may be determined based on the first weight associated with the user embedding "$E_3$", and the vector representation of the user embedding "$E_3$" itself, and so on.

The circuitry 202 may be further configured to the generate the second vector 318 (i.e., "$E'_1$") based on the determined plurality of weighted vectors. In accordance with an embodiment, the circuitry 202 may generate the second vector 318, via concatenation of the plurality of weighted vectors (associated with nodes representative of the user embeddings "$E_2$", "$E_3$", "$E_4$", and "$E_5$") or computation of an average of the plurality of weighted vectors.

It should be noted that the scenario 600 of FIG. 6 is for exemplary purposes and should not be construed to limit the scope of the disclosure.

Figure 7:
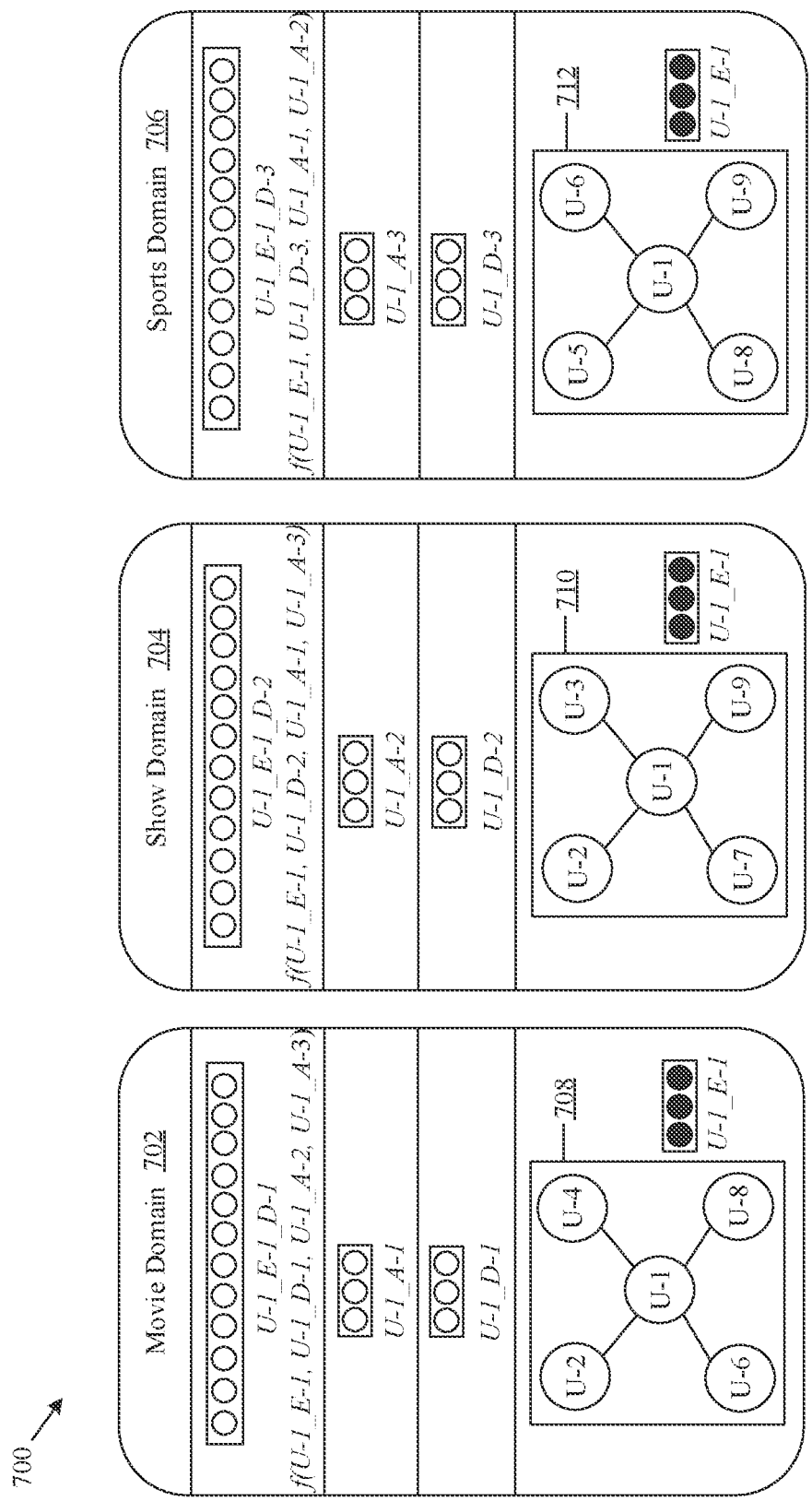
FIG. 7 is a diagram that illustrates an exemplary scenario for generation of trust-based embeddings of a user in a plurality of domains based on correlation between the user and neighbors of the user in each of the plurality of domains, in accordance with an embodiment of the disclosure.

FIG. 7 is a diagram that illustrates an exemplary scenario for generation of trust-based embeddings of a user in a plurality of domains based on correlation between the user and neighbors of the user in each of the plurality of domains, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown an exemplary scenario 700. In the exemplary scenario 700 there are shown a plurality of domains associated with an over-the-top (OTT) platform, viz., a movies domain 702, a shows domain 704, and a sports domain 706. The scenario 700 describes recommendation of items across domains (i.e., cross-domain or across a set of application areas). For example, in the scenario 700, the multiple domains or application areas of content available on OTT platforms. The multiple domains or application areas may correspond to the movies domain 702, the shows domain 704, and the sports domain 706.

The user 116 (or the user "$U_1$") may be a consumer of items associated with each of the plurality of domains. There is further shown trust-based embeddings (for example, "$U_1$-$D_1$", "$U_1$-$A_1$", "$U_1$-$D_2$", "$U_1$-$A_2$", "$U_1$-$D_3$", and "$U_1$-$A_3$") of the user 116 in each of the plurality of domains. The circuitry 202 may generate updated user embeddings (for example, "$U_1$-$E_1$-$D_1$", "$U_1$-$E_1$-$D_2$", and "$U_1$-$E_1$-$D_3$") associated with the user 116 for each of the plurality of domains based on the trust-based embeddings. The user 116 may be referred to as a target user who may be recommended items associated with a target domain, based on a modified user embedding associated with the target domain.

In accordance with an embodiment, the circuitry 202 may be configured to determine neighborhood information associated with the user 116 in each of the plurality of domains based on correlation information associated with users in each of the plurality of domains. For example, the circuitry 202 may determine first neighborhood information 708 associated with the user 116 based on correlation information associated with users in the movies domain 702. Similarly, the circuitry 202 may determine second neighborhood information 710 associated with the user 116 in the shows domain 704, and third neighborhood information 712 associated with the user 116 in the sports domain 706.

The circuitry 202 may be further configured to generate a first trust-based embedding of the user 116, such as, "$U_1$-$D_1$", and a second trust-based embedding of the user 116, such as, "$U_1$-$A_1$", with respect to a first set of users in the movies domain 702. The first trust-based embedding and the second trust-based embedding may be generated based on the first neighborhood information 708. The second trust-based embedding may be generated based on an application of the GAT model 108 on the first neighborhood information 708. The circuitry 202 may modify a user embedding "$U_1$-$E_1$" associated with the user 116 (i.e., the third vector 320) based on the first trust-based embedding (i.e., "$U_1$-$D_1$") if the movies domain 702 is the target domain. The circuitry 202 may modify the user embedding "$U_1$-$E_1$" (i.e., the third vector 320) based on the second trust-based embedding (i.e., "$U_1$-$A_1$") if the movies domain 702 is an auxiliary domain with respect to another target domain (such as, the shows domain 704 or the sports domain 706).

The circuitry 202 may be further configured to generate a third trust-based embedding of the user 116, such as, "$U_1$-$D_2$", and a fourth trust-based embedding of the user 116, such as, "$U_1$-$A_2$", with respect to a second set of users in the shows domain 704. The third trust-based embedding and the fourth trust-based embedding may be generated based on the second neighborhood information 710. The fourth trust-based embedding may be generated based on an application of the GAT model 108 on the second neighborhood information 710. The circuitry 202 may modify the user embedding "$U_1$-$E_1$" (i.e., the third vector 320) based on the third trust-based embedding (i.e., "$U_1$-$D_2$") if the shows domain 704 is the target domain. The circuitry 202 may modify the user embedding "$U_1$-$E_1$" (i.e., the third vector 320) based on the fourth trust-based embedding (i.e., "$U_1$-$A_2$") if the shows domain 704 is an auxiliary domain with respect to another target domain (i.e., the movies domain 702 or the sports domain 706).

The circuitry 202 may be further configured to generate a fifth trust-based embedding of the user 116, i.e., "$U_1$-$D_3$", and a sixth trust-based embedding of the user 116, i.e., "$U_1$-$A_3$", with respect to a third set of users in the sports domain 706. The fifth trust-based embedding and the sixth trust-based embedding may be generated based on the third neighborhood information 712. The sixth trust-based embedding may be generated based on an application of the GAT model 108 on the third neighborhood information 712. The circuitry 202 may modify the user embedding "$U_1$-$E_1$" (i.e., the third vector 320) based on the fifth trust-based embedding (i.e., "$U_1$-$D_3$") if the sports domain 706 is the target domain. The circuitry 202 may modify the user embedding "$U_1$-$E_1$" (i.e., the third vector 320) based on the sixth trust-based embedding (i.e., "$U_1$-$A_3$") if the sports domain 706 is an auxiliary domain with respect to another target domain (i.e., the movies domain 702 or the shows domain 704).

In accordance with an embodiment, the circuitry 202 may be configured to determine a weight associated with each auxiliary domain based on a count of users in a target domain and a count of users common to the target domain and the corresponding auxiliary domain. The determined weight associated with an auxiliary domain may be indicative of a relevancy of an auxiliary domain to a target domain. For example, in a case where the target domain is the movies domain 702, and the auxiliary domains include the shows domain 704 and the sports domain 706. A first cross-domain weight (i.e., "$W_{movie\text{-}show}$") associated with the shows domain 704, based on the movies domain 702 as the target domain, may be determined based on following expression (7):

$$W_{movie\text{-}shows} = \frac{\text{count of users common to the movie domain and shows domain}}{\text{count of users in movie domain}} \quad (7)$$

A second cross-domain weight ($W_{movie\text{-}sports}$) associated with the sports domain 706 based on the movies domain 702 as the target domain may be determined based on following expression (8):

$$W_{movie\text{-}sports} = \frac{\text{count of users common to the movie domain and sports domain}}{\text{count of users in movie domain}} \quad (8)$$

The determination of cross-domain weights may be implemented based on the following pseudo code:

```
Function compute weight (variable target_domain, variable list [aux_domain1, ..., aux_domain n-1] ):
    weights=[ ]
    for each aux_domain in. list:
        W_target-aux= get_weights (target_domain, aux_domain)
        weights.append (W_target-aux)
    return weights
```

In the pseudo code, $W_{target\text{-}aux}$ may correspond to "$W_{movie\text{-}show}$" or "$W_{movie\text{-}sports}$". The returned value may be "weights=["$W_{movie\text{-}show}$", "$W_{movie\text{-}sports}$"].

The function "get_weights (target_domain, aux_domain)" may calculate the weights based on expressions (7) and (8). For example, the weight "$W_{movie\text{-}show}$" may correspond to a ratio between count of users common to the movie domain and shows domain and count of users in movie domain (as shown in expression (7)). Similarly, the weight "$W_{movie\text{-}sports}$" may correspond to a ratio between count of users common to the movie domain and sports domain and count of users in movie domain (as shown in expression (8)).

Since the target domain is the movies domain 702, the user embedding "$U_1\text{-}E_1$" may be modified based on a function that comprises the first trust-based embedding (i.e., "$U_1\text{-}D_1$"), the fourth trust-based embedding (i.e., "$U_1\text{-}A_2$"), and the sixth trust-based embedding (i.e., "$U_1\text{-}A_3$") as independent variables. The circuitry 202 may be configured to generate a weighted fourth trust-based embedding (i.e., "$W_{movie\text{-}shows}*U_1\text{-}A_2$") based on "$W_{movie\text{-}shows}$" and "$U_1\text{-}A_2$". Similarly, the circuitry 202 may be configured to generate a weighted sixth trust-based embedding (i.e., "$W_{movie\text{-}sports}*U_1\text{-}A_3$") based on "$W_{movie\text{-}sports}$" and "$U_1\text{-}A_3$".

The circuitry 202 may be further configured to generate, via the recommendation model 110, a modified user embedding "$U_1\text{-}E_1\text{-}D_1$" associated with the movies domain 702 based on an application of the recommendation model 110 on "$U_1\text{-}E_1$", "$U_1\text{-}D_1$", "$W_{movie\text{-}shows}*U_1\text{-}A_2$", and "$W_{movie\text{-}sports}*U_1\text{-}A_3$". In accordance with an embodiment, the recommendation model 110 may generate "$U_1\text{-}E_1\text{-}D_1$" based on concatenation of "$U_1\text{-}E_1$", "$U_1\text{-}D_1$", "$W_{movie\text{-}show}*U_1\text{-}A_2$", and "$W_{movie\text{-}sports}\text{-}U_1\text{-}A_3$". In accordance with an embodiment, "$U_1\text{-}E_1\text{-}D_1$" may be generated based on aggregation of "$U_1\text{-}E_1$", "$U_1\text{-}D_1$", "$W_{movie\text{-}shows}*U_1\text{-}A_2$", and "$W_{movie\text{-}sports}*U_1\text{-}A_3$".

The above mentioned generation of the modified user embedding may be implemented based on the following pseudo code:

```
Function generate user_embeddings (variable_Domains, variable target_Domains):
    for each aux in Domains:
        T_aux = function auxillary_embeddings (U-I matrix_aux, Trust matrix)
        for each domain in target_domains:
            Target_User_embeddings = Func target_embed (U-I matrix, trust matrix)
            Aux_domains= Domains-domain # list [aux_domain1, ..., aux_domain "n-1"]
    weights=Function compute weight (variable domain, variable aux_domains)
    User_final_Target = $\vec{U1}$+w1(T_target1)+w2(T_aux2)+w3(T_aux3)
    return User_final_Target
```

In the pseudo code, "$\vec{U1}$" may correspond to "$U_1$-$E_1$", "w2" may correspond to "$W_{movie\text{-}show}$", "w3" may correspond to "$W_{movie\text{-}sports}$", and User_final$_{Target}$ may correspond to "$U_1$-$E_1$-$D_1$". Further "w1($T_{target1}$)" may correspond to "$W_{movie\text{-}show}$*$U_1$-$A_2$" and "w3($T_{aux3}$)" may correspond to "$W_{movie\text{-}sports}$*$U_1$-$A_3$". It may be noted that "w1" is "1". Therefore, "$T_{target1}$" may correspond to "$U_1$-$D_1$".

In the pseudo code, "Func auxillary_embed (U-I interaction matrix, trust-matrix)" may return embeddings of all users in auxiliary domains using GAT (i.e., "$U_1$-$A_2$" and "$U_1$-$A_3$", and "Func target_embed(U-I interaction matrix, trust-matrix)" may return target-1 domain embeddings of all users in the target domain (i.e., "$U_1$-$D_1$").

The above pseudo code may be for a function to calculate intra- and inter-domain trust vectors for multiple domains. For instance, auxiliary trust embeddings may be calculated for each auxiliary domain with respect to a target domain. Such auxiliary trust embeddings are called inter-domain trust vectors. Further, a user trust embedding may be calculated by use of the recommendation model 110. Also, an intra-domain trust embedding may be calculated for the target domain. Thereafter, a final embedding vector may be calculated based on a sum of the user trust embedding, the intra-domain trust embedding, and the inter-domain trust embedding (i.e., the auxiliary trust embeddings).

The circuitry 202 may generate, via the recommendation model 110, a modified user embedding "$U_1$-$E_1$-$D_2$" associated with the shows domain 704 (i.e., another target domain) based on an application of the recommendation model 110 on "$U_1$-$E_1$", "$U_1$-$D_2$", "$W_{shows\text{-}movie}$*$U_1$-$A_1$", and "$W_{shows\text{-}sports}$*$U_1$-$A_3$". The weights "$W_{shows\text{-}movie}$" and "$W_{show\text{-}sports}$" may be determined based on following expressions (9) and (10), respectively:

$$W_{shows-movie} = \frac{\text{count of users common to the shows domain and movie domain}}{\text{count of users in show domain}} \quad (9)$$

$$W_{shows-sports} = \frac{\text{count of users common to the shows domain and sports domain}}{\text{count of users in show domain}} \quad (10)$$

Similarly, the circuitry 202 may generate, via the recommendation model 110, a modified user embedding "$U_1$-$E_1$-$D_3$" associated with the sports domain 706 (i.e., another target domain) based on an application of the recommendation model 110 on "$U_1$-$E_1$", "$U_1$-$D_3$", "$W_{sports\text{-}movie}$*$U_1$-$A_1$", and "$W_{sports\text{-}show}$*$U_1$-$A_2$". The weights "$W_{shows\text{-}movie}$" and "$W_{shows\text{-}sports}$" may be determined based on following expressions (11) and (12), respectively:

$$W_{sports-movie} = \frac{\text{count of users common to the sports domain and movie domain}}{\text{count of users in sports domain}} \quad (11)$$

$$W_{sports-shows} = \frac{\text{count of users common to the sports domain and shows domain}}{\text{count of users in sports domain}} \quad (12)$$

The circuitry 202 may be further configured to recommend items, via the recommendation model 110, associated with a target domain (for example, the movies domain 702, the shows domain 704, or the sports domain 706) to the target user (i.e., the user 116) based on a corresponding generated modified user embedding (for example, "$U_1$-$E_1$-$D_1$", "$U_1$-$E_1$-$D_2$", or "$U_1$-$E_1$-$D_3$").

It should be noted that the scenario 700 of FIG. 7 is for exemplary purposes and should not be construed to limit the scope of the disclosure.

Figure 8:
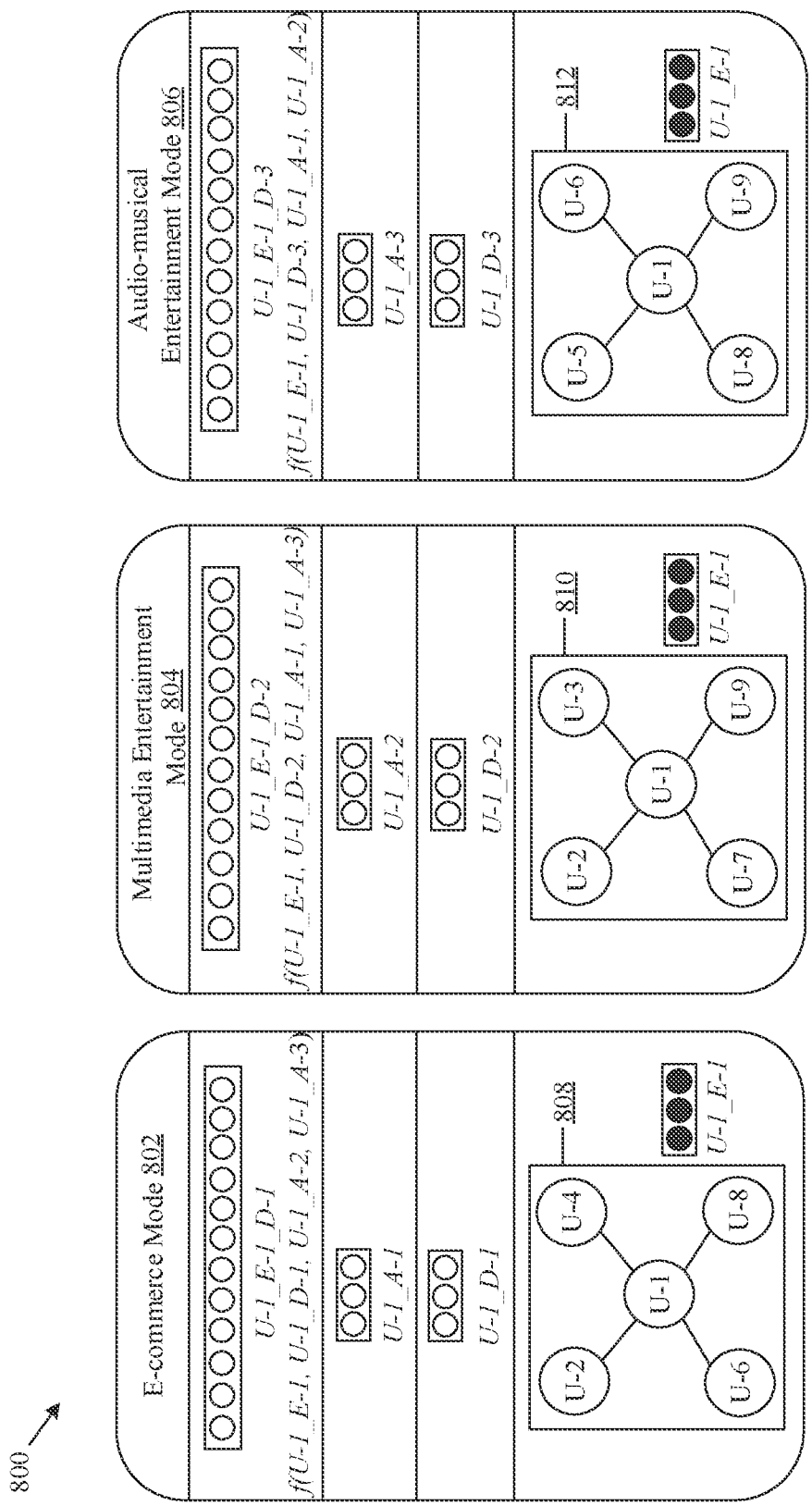
FIG. 8 is a diagram that illustrates an exemplary scenario for generation of trust-based embeddings of a user in a multimodal architecture comprising a plurality of domains based on correlation between the user and neighbors of the user, in accordance with an embodiment of the disclosure.

FIG. 8 is a diagram that illustrates an exemplary scenario for generation of trust-based embeddings of a user in a multimodal architecture comprising a plurality of domains based on correlation between the user and neighbors of the user, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown an exemplary scenario 800. In the exemplary scenario 800 there are shown a plurality of domains that may correspond to a plurality of modes (for example, an e-commerce mode 802, a multimedia entertainment mode 804, and an audio-musical entertainment mode 806). The plurality of modes may, however, be associated with a single architecture. There is further shown trust-based embeddings (for example, "$U_1$-$D_1$", "$U_1$-$A_1$", "$U_1$-$D_2$", "$U_1$-$A_2$", "$U_1$-$D_3$", and "$U_1$-$A_3$") of the user 116 (i.e., a target user) in each of the plurality of modes. The circuitry 202 may generate updated user embeddings (for example, "$U_1$-$E_1$-$D_1$", "$U_1$-$E_1$-$D_2$", and "$U_1$-$E_1$-$D_3$") associated with the user 116 for each of the plurality of modes based on the trust-based embeddings. The scenario 800 describes recommendation of items across modes (i.e., multi-modal). For example, in the scenario 800, the multiple modes correspond to the e-commerce mode 802, the multimedia entertainment mode 804, and the audio-musical entertainment mode 806.

The circuitry 202 may determine first neighborhood information 808 associated with the user 116 based on correlation information associated with users in the e-commerce mode 802. Similarly, the circuitry 202 may determine second neighborhood information 810 associated with the user 116 in the multimedia entertainment mode 804, and third neighborhood information 812 associated with the user 116 in the audio-musical entertainment mode 806. The circuitry 202 may generate "$U_1$-$D_1$" and "$U_1$-$A_1$" with respect to a first set of users in the e-commerce mode 802 based on the first neighborhood information 808. Specifically, "$U_1$-$A_1$" may be generated based on an application of the GAT model 108 on the first neighborhood information 808. The circuitry 202 may modify "$U_1$-$E_1$" based on "$U_1$-$D_1$" if the e-commerce mode 802 is the target domain. On the other hand, "$U_1$-$E_1$" may be modified based on "$U_1$-$A_1$" if the e-commerce mode 802 is an auxiliary domain with respect to a target domain (such as, the multimedia entertainment mode 804 and the audio-musical entertainment mode 806).

The circuitry 202 may generate "$U_1$-$D_2$" and "$U_1$-$A_2$" with respect to a second set of users in the multimedia entertainment mode 804 based on the second neighborhood information 810. Specifically, "$U_1$-$A_2$" may be generated based on an application of the GAT model 108 on the second neighborhood information 810. The circuitry 202 may modify "$U_1$-$E_1$" based on "$U_1$-$D_2$" if the multimedia entertainment mode 804 is the target domain. On the other hand, "$U_1$-$E_1$" may be modified based on "$U_1$-$A_2$" if the multimedia entertainment mode 804 is an auxiliary domain with respect to a target domain (such as, the e-commerce mode 802 and the audio-musical entertainment mode 806). The circuitry 202 may generate "$U_1$-$D_3$" and "$U_1$-$A_3$" with respect to a third set of users in the audio-musical entertainment mode 806 based on the third neighborhood information 812. Specifically, "$U_1$-$A_3$" may be generated based on an application of the GAT model 108 on the third neighborhood information 812. The circuitry 202 may modify "$U_1$-$E_1$" based on "$U_1$-$D_3$" if the multimedia entertainment mode 804 is the target domain. On the other hand, "$U_1$-$E_1$" may be modified based on "$U_1$-$A_2$" if the audio-musical entertainment mode 806 is an auxiliary domain with respect to a target domain (such as, the e-commerce mode 802 and the multimedia entertainment mode 804).

In accordance with an embodiment, the circuitry 202 may be configured to determine a weight associated with each auxiliary domain based on a count of users in a target domain and a count of users common to the target domain and the corresponding auxiliary domain. If the e-commerce mode 802 is the target domain, a cross-domain weight associated with the multimedia entertainment mode 804 "$W_{e\_commerce\text{-}multimedia\_entertainment}$" may be determined as a ratio of count of users common to the e-commerce mode 802 and the multimedia entertainment mode 804 and a count of users in the e-commerce mode 802. Similarly, a cross-domain weight associated with the audio-musical entertainment mode 806 "$W_{e\text{-}commerce\text{-}audio\text{-}musical\text{-}entertainment}$" may be determined as a ratio of count of users common to the e-commerce mode 802 and the audio-musical entertainment mode 806 and a count of users in the e-commerce mode 802. The circuitry 202 may further generate an embedding "$W_{e\_commerce\text{-}multimedia\_entertainment}*U_1\text{-}A_2$" and an embedding "$W_{e\_commerce\text{-}audio\_musical\_entertainment}*U_1\text{-}A_3$".

The circuitry 202 may be further configured to generate, via the recommendation model 110, a modified user embedding "$U_1$-$E_1$-$D_1$" associated with the e-commerce mode 802 based on an application of the recommendation model 110 on "$U_1$-$E_1$", "$U_1$-$D_1$", "$W_{e\_commerce\text{-}multimedia\_entertainment}*U_1\text{-}A_2$", and "$W_{e\_commerce\text{-}audio\_musical\_entertainment}*U_1\text{-}A_3$". In accordance with an embodiment, the recommendation model 110 may generate "$U_1$-$E_1$-$D_1$" based on concatenation of "$U_1$-$E_1$", "$U_1$-$D_1$", "$W_{e\_commerce\text{-}multimedia\_entertainment}*U_1\text{-}A_2$", and "$W_{e\_commerce\text{-}audio\_musical\_entertainment}*U_1\text{-}A_3$". In accordance with an embodiment, "$U_1$-$E_1$-$D_1$" may be generated based on aggregation of "$U_1$-$E_1$", "$U_1$-$D_1$", "$W_{e\_commerce\text{-}multimedia\_entertainment}*U_1\text{-}A_2$", and "$W_{e\_commerce\text{-}audio\_musical\_entertainment}*U_1\text{-}A_3$".

Similarly, the circuitry 202 may be further configured to generate, via the recommendation model 110, a modified user embedding "$U_1$-$E_1$-$D_2$" associated with the multimedia entertainment mode 804 based on an application of the recommendation model 110 on "$U_1$-$E_1$", "$U_1$-$D_2$", "$W_{multimedia\_entertainment\text{-}e\_commerce}*U_1\text{-}A_1$", and "$W_{multimedia\_entertainment\text{-}audio\_musical\_entertainment}*U_1\text{-}A_3$". The circuitry 202 may be further configured to generate, via the recommendation model 110, a modified user embedding "$U_1$-$E_1$-$D_3$" associated with the audio-musical entertainment mode 806 based on an application of the recommendation model 110 on "$U_1$-$E_1$", "$U_1$-$D_3$", "$W_{audio\_musical\_entertainment\text{-}e\_commerce}*U_1\text{-}A_1$", and "$W_{audio\_musical\_entertainment\_multimedia\_entertainment}*U_1\text{-}A_3$".

It may be noted that "$W_{multimedia\_entertainment\text{-}e\_commerce}$" may be determined as a ratio of count of users common to the e-commerce mode 802 and the multimedia entertainment mode 804 and a count of users in the multimedia entertainment mode 804. Similarly, "$W_{multimedia\_entertainment\text{-}audio\_musical\_entertainment}$" may be determined as a ratio of count of users common to the multimedia entertainment mode 804 and the audio-musical entertainment mode 806 and a count of users in the multimedia entertainment mode 804. Furthermore, "$W_{audio\_musical\_entertainment\text{-}e\_commerce}$", may be determined as a ratio of count of users common to the e-commerce mode 802 and the audio-musical entertainment mode 806 and a count of users in the audio-musical entertainment mode 806. Similarly, "$W_{audio\_musical\_entertainment\_multimedia\_entertainment}$" may be determined as a ratio of count of users common to the multimedia entertainment mode 804 and the audio-musical entertainment mode 806 and a count of users in the audio-musical entertainment mode 806.

It should be noted that the scenario 800 of FIG. 8 is for exemplary purposes and should not be construed to limit the scope of the disclosure.

The embodiments provide a generic model (for example, the recommendation model 110) which may support utilization of additional neighborhood information via multi-modal architecture and additional domain via cross-domain modeling. Further, the embodiments (i.e., the recommendation model 110) utilize neighborhood information associated with multiple domains. The domains may correspond to modes that include items such as audio, video, images, transaction history, and so on. Since the embodiments generate both intra-domain and inter-domain embeddings independently, i.e., without any cross-interaction amongst the modes, the recommendation model 110 may be applied to multi-modal settings efficiently.

Figure 9:
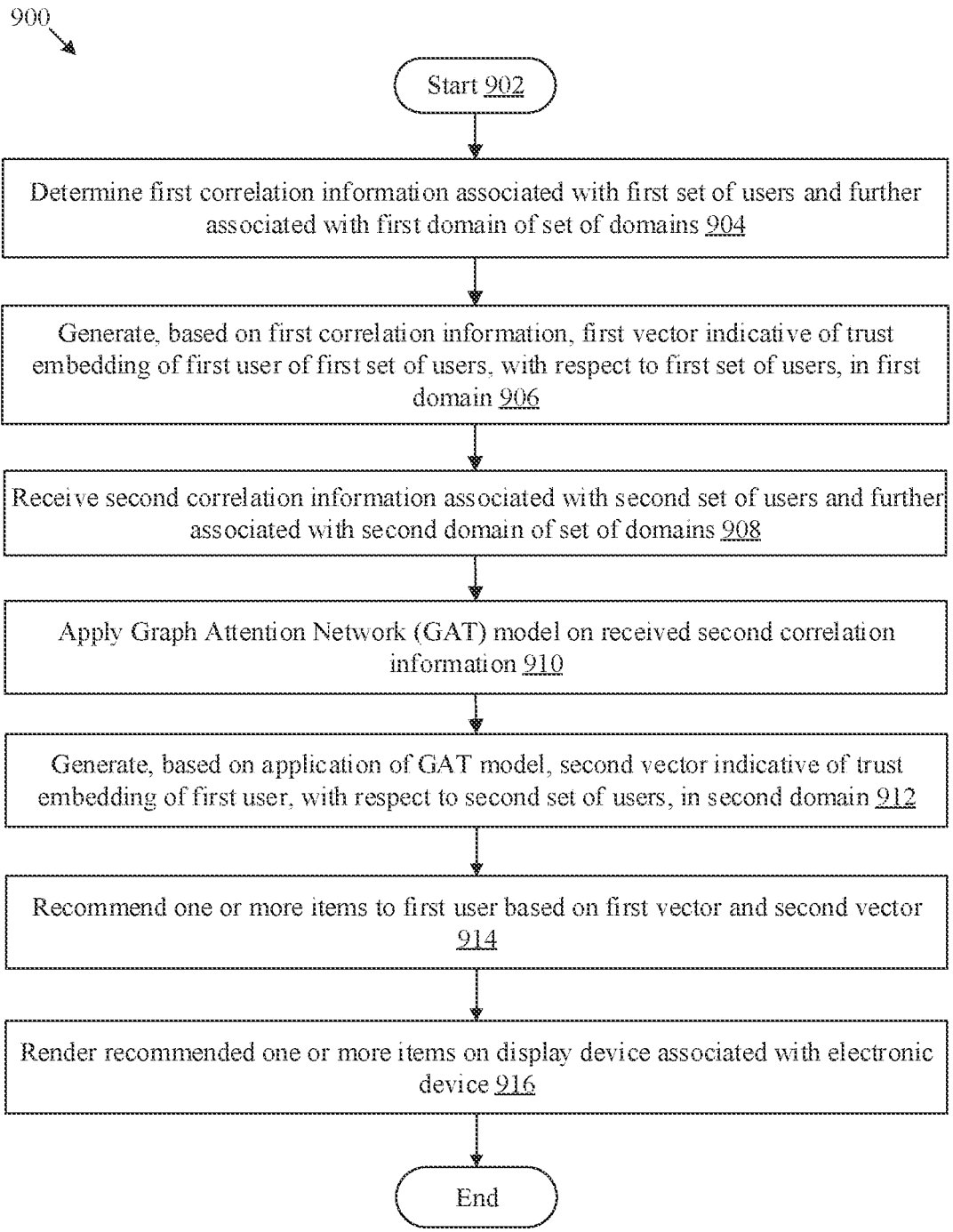
FIG. 9 is a flowchart that illustrates operations for an exemplary method for generation of recommendations using trust-based embeddings, in accordance with an embodiment of the disclosure.

FIG. 9 is a flowchart that illustrates operations for an exemplary method for generation of recommendations using trust-based embeddings, in accordance with an embodiment of the disclosure. FIG. 8 is explained in conjunction with elements from FIG. 1, FIG. 2, FIG. 3, FIG. 4, FIG. 5, FIG. 6, FIG. 7, and FIG. 8. With reference to FIG. 9, there is shown a flowchart 900. The operations from 902 to 916 may be implemented by any computing system, such as, by the electronic device 102 of FIG. 1. The operations may start at 902 and may proceed to 904.

At 904, first correlation information associated with a first set of users and further associated with a first domain of a set of domains may be determined. In at least one embodiment, the circuitry 202 may be configured to determine the first correlation information associated with the first set of users and further associated with the first domain of the set of domains. The first set of users may include a first user (i.e., the user 116) and a plurality of second users. The first correlation information may include an association between the first user (i.e., the user 116) and the plurality of second users. In some embodiments, the circuitry 202 may be configured to receive rating information associated with the first set of users, for a set of items associated with first domain. The circuitry 202 may be further configured to determine a trust score of the first user (i.e., the user 116) with respect to each of the first set of users, based on the received rating information. The trust score of the first user (i.e., the user 116) with respect to each user of the first set of users may correspond to a co-positive rating of one or more items of the set of items, by the first user (i.e., the user 116) and the corresponding user of the first set of users. The circuitry 202 may be further configured to determine the first correlation information based on the determined trust score of the first user (i.e., the user 116) with respect to each of the first set of users. The details of determination the first correlation information, are described, for example, in FIG. 1, FIG. 3 (with respect to the user-user trust matrix 306), FIG. 4 (with respect to the user-user trust matrix 408), and FIG. 5 (at 508).

At 906, a first vector indicative of a trust embedding of the first user (i.e., the user 116) of the first set of users, with respect to the first set of users, in the first domain, may be generated based on the first correlation information. In at least one embodiment, the circuitry 202 may be configured to generate, based on the first correlation information, the first vector indicative of the trust embedding of the first user (i.e., the user 116) of the first set of users, with respect to the first set of users, in the first domain. The circuitry 202 may be further configured to determine first neighborhood information associated with the first user (i.e., the user 116) and further associated with the first domain, based on the determined first correlation information. The first neighborhood information may be indicative of users (i.e., the plurality of second users) of the first set of users correlated to the first user (i.e., the user 116). In some embodiments, the circuitry 202 may be configured to compare the determined trust score of the first user (i.e., the user 116) and a predefined threshold. The circuitry 202 may be further configured to determine the first neighborhood information associated with the first user (i.e., the user 116) and further associated with the first domain, based on the comparison. The generation of the first vector may be further based on the determined first neighborhood information. The details of generation of the first vector are described, for example, in FIG. 1, FIG. 3 (with respect to the first vector 310), and FIG. 5 (at 512).

At 908, second correlation information associated with a second set of users and further associated with a second domain of the set of domains may be received. In at least one embodiment, the circuitry 202 may be configured to receive the second correlation information associated with the second set of users and further associated with the second domain of the set of domains. The second set of users includes the first user (i.e., the user 116) and a plurality of third users. The second correlation information may include an association of the first user (i.e., the user 116) and the plurality of third users. The details of reception of the second correlation information, are described, for example, in FIG. 1, FIG. 3 (with respect to the user-user trust matrix 306), and FIG. 6 (with respect to the second neighborhood information 316).

At 910, the GAT model 108 may be applied on the determined second correlation information. In at least one embodiment, the circuitry 202 may be configured to apply the GAT model 108 on the determined second correlation information. The circuitry 202 may be further configured to determine second neighborhood information associated with the first user (i.e., the user 116) and further associated with the second domain, based on the received second correlation information. The GAT model 108 may be further applied on the determined second neighborhood information. The second neighborhood information may be indicative of users (i.e., the plurality of third users) of the second set of users correlated to the first user (i.e., the user 116). The details of application of the GAT model 108, are described, for example, in FIG. 1, FIG. 3, and FIG. 6.

At 912, a second vector indicative of a trust embedding of the first user (i.e., the user 116), with respect to the second set of users, in the second domain may be generated based on the application of the GAT model 108. In at least one embodiment, the circuitry 202 may be configured to generate, based on the application of the GAT model 108, the second vector indicative of the trust embedding of the first user (i.e., the user 116), with respect to the second set of users, in the second domain. The generation of the second vector may be further based on the application of the GAT model 108 further on the determined second neighborhood information. In some embodiments, the circuitry 202 may be configured to determine, by the GAT model 108, a first weight associated with each of plurality of vectors for each corresponding user of the plurality of third users, based on the determined second correlation information. The circuitry 202 may be further configured to determine a plurality of weighted vectors based on the determined first weight and each corresponding vector of the plurality of vectors. The circuitry 202 may be further configured to generate the second vector based on the determined plurality of weighted vectors. The details of generation of the second vector, are described, for example, in FIG. 1, FIG. 3 (with respect to the second vector 318), and FIG. 6.

At 914, one or more items may be recommended to the first user based on the first vector and the second vector. In at least one embodiment, the circuitry 202 may be configured to recommend the one or more items to the first user, based on the first vector and the second vector. The circuitry 202 may be further configured to determine a second weight associated with the second vector based on a first count of the first set of users, a second count of the second set of users, and a third count of users common to the first set of users and the second set of users. The circuitry 202 may be further configured to generate a weighted second vector based on the second vector and the determined second weight. The circuitry 202 may be further configured to apply the recommendation model 110 on the weighted second vector. The circuitry 202 may be further configured to apply the recommendation model 110 on a third vector indicative of at least one of collaborative filtering information associated with the first user (i.e., the user 116), preference information associated with the first user (i.e., the user 116), demographic information associated with the first user (i.e., the user 116), or a purchase history associated with the first user (i.e., the user 116). The one or more items may be recommended to the user 116 based on application of the recommendation model 110 on the first vector, the weighted second vector, and the third vector. The details of recommending of the one or more items to the first user, are described, for example, in FIG. 1, FIG. 3, and FIG. 7.

At 916, the recommended one or more items may be rendered on the display device 210 associated with the electronic device 102. In at least one embodiment, the circuitry 202 may be configured to render the recommended one or more items on the display device 210 associated with the electronic device 102. In an embodiment, the trust-based embeddings may be updated periodically over a pre-defined time-period specified by the user 116. Accordingly, the circuitry 202 may update the recommendations periodically based on the periodic update of the trust-based embeddings. The updated recommendations may be rendered via the display device 210. Control may pass to end.

Although the flowchart 900 is illustrated as discrete operations, such as 904, 906, 908, 910, 912, 914, and 916, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (such as the electronic device 102). The computer-executable instructions may cause the machine and/or computer to perform operations that include determination of first correlation information associated with a first set of users and further associated with a first domain of a set of domains. The operations may further include generation, based on the first correlation information, a first vector indicative of the trust embedding of the first user (i.e., the user 116) with respect to the first set of users in the first domain. The operations may further include reception of second correlation information associated with a second set of users and further associated with a second domain of the set of domains. The operations may further include application of a Graph Attention Network (GAT) model (e.g., the GAT model 108) on the received second correlation information. The operations may further include generation, based on the application of the GAT model 108, a second vector indicative of a trust embedding of the first user (i.e., the user 116), with respect to the second set of users, in the second domain. The operations may further include recommendation of one or more items to the first user (i.e., the user 116), based on the first vector and the second vector. The operations may further include rendering of the recommended one or more items on a display device (e.g., the display device 210) associated with the electronic device 102.

Exemplary aspects of the disclosure may include an electronic device (such as, the electronic device 102 of FIG. 1) that may include circuitry (such as, the circuitry 202), that may be communicatively coupled to the electronic device (such as, the electronic device 102 of FIG. 1). The electronic device 102 may further include memory (such as, the memory 204 of FIG. 2). The circuitry 202 may be configured to determine the first correlation information associated with the first set of users and further associated with the first domain of a set of domains. The set of domains may correspond to at least one of a set of modes or a set of application areas. The first set of users may include the first user (i.e., the user 116) and a plurality of second users. The first correlation information may include an association between the first user (i.e., the user 116) and the plurality of second users. The circuitry 202 may be further configured to generate, based on the first correlation information, the first vector indicative of the trust embedding of the first user (i.e., the user 116) with respect to the first set of users in the first domain. The circuitry 202 may be further configured to receive second correlation information associated with the second set of users and further associated with the second domain of the set of domains. The second set of users may include the first user (i.e., the user 116) and a plurality of third users. The second correlation information may include an association of the first user (i.e., the user 116) and the plurality of third users. The circuitry 202 may be further configured to apply a Graph Attention Network (GAT) model (e.g., the GAT model 108) on the received second correlation information. The circuitry 202 may be further configured to generate, based on the application of the GAT model 108, a second vector indicative of a trust embedding of the first user (i.e., the user 116), with respect to the second set of users, in the second domain. The circuitry 202 may be further configured to recommend one or more items to the first user (i.e., the user 116), based on the on the first vector and the second vector. The circuitry 202 may be further configured to render the recommended one or more items on a display device (e.g., the display device 210) associated with the electronic device 102.

In accordance with an embodiment, the circuitry 202 may be further configured to determine first neighborhood information associated with the first user (i.e., the user 116) and further associated with the first domain, based on the determined first correlation information. The generation of the first vector may be further based on the first neighborhood information. The first neighborhood information may be indicative of users of the first set of users correlated to the first user (i.e., the user 116).

In accordance with an embodiment, the circuitry 202 may be further configured to determine second neighborhood information associated with the first user (i.e., the user 116) and further associated with the second domain, based on the received second correlation information. The GAT model 108 may be further applied on the determined second neighborhood information. The generation of the second vector may be further based on the application of the GAT model 108 further on the determined second neighborhood information. The second neighborhood information may be indicative of users of the second set of users correlated to the first user (i.e., the user 116).

In accordance with an embodiment, the circuitry 202 may be further configured to receive rating information associated with the first set of users, for a set of items associated with first domain. The circuitry 202 may be further configured to determine a trust score of the first user (i.e., the user 116) with respect to each of the first set of users, based on the received rating information. The trust score of the first user (i.e., the user 116) with respect to each user of the first set of users may correspond to a co-positive rating of one or more items of the set of items, by the first user (i.e., the user 116) and the corresponding user of the first set of users. The circuitry 202 may be further configured to determine the first correlation information based on the determined trust score of the first user (i.e., the user 116) with respect to each of the first set of users. In an embodiment, the determined trust score of the first user with respect to each user of the first set of users may correspond to a co-positive rating of one or more items of the set of items, provided by the first user and the corresponding user of the first set of users.

In accordance with an embodiment, the circuitry 202 may be further configured to compare the determined trust score of the first user (i.e., the user 116) and a predefined threshold. The circuitry 202 may be further configured to determine first neighborhood information associated with the first user (i.e., the user 116) and further associated with the first domain, based on the comparison.

In accordance with an embodiment, the circuitry 202 may be further configured to determine, by the GAT model 108, a first weight associated with each of plurality of vectors for each corresponding user of the plurality of third users, based on the second correlation information. Each of the plurality of vectors may be indicative of a trust embedding associated the corresponding user of the plurality of third users. The circuitry 202 may be further configured to determine a plurality of weighted vectors based on the determined first weight and each corresponding vector of the plurality of vectors. The circuitry 202 may be further configured to generate the second vector based on the determined plurality of weighted vectors.

In accordance with an embodiment, the circuitry 202 may be further configured to determine a second weight associated with the second vector based on a first count of the first set of users, a second count of the second set of users, and a third count of users common to the first set of users and the second set of users. The circuitry 202 may be further configured to generate a weighted second vector based on the second vector and the determined second weight. The circuitry 202 may be further configured to apply a recommendation model (e.g., the recommendation model 110) on the determined first vector the determined weighted second vector. The one or more items may be recommended for the first user (e.g., user 116) further based on the application of the recommendation model 110. The recommendation model 110 may be further applied on a third vector indicative of at least one of collaborative filtering information associated with the first user (i.e., the user 116), preference information associated with the first user (i.e., the user 116), demographic information associated with the first user (i.e., the user 116), or a purchase history associated with the first user (i.e., the user 116).

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising:
   circuitry configured to:
   receive, for each item of a first set of items associated with a first domain of a set of domains, first rating information from a first user of a first set of users;
   receive, for each item of a second set of items associated with the first domain, second rating information from a second user of the first set of users;
   determine, from the first set of items and the second set of items, common items rated by each of the first user and the second user;
   determine a trust score of the first user based on the first rating information associated with the common items, the second rating information associated with the common items, and a count of the second set of items, wherein
      the determined trust score of the first user is a value that indicates a trust of the first user with respect to the second user;
   determine first correlation information based on the determined trust score of the first user;
   generate a first vector based on the determined first correlation information, wherein
      the first vector indicates a first trust embedding of the first user in the first domain, and
      the first trust embedding of the first user is with respect to the first set of users;
   receive second correlation information associated with a second set of users and associated with a second domain of the set of domains;
   apply a Graph Attention Network (GAT) model on the received second correlation information;
   generate a second vector based on the application of the GAT model, wherein
      the second vector indicates a second trust embedding of the first user in the second domain, and
      the second trust embedding of the first user is with respect to the second set of users;
   recommend one or more items to the first user, based on the first vector and the second vector; and
   render the recommended one or more items on a display device associated with the electronic device.

2. The electronic device according to claim 1, wherein
   the first set of users includes the first user and a plurality of second users,
   the second set of users includes the first user and a plurality of third users,
   the first correlation information indicates an association between the first user and the plurality of second users, and
   the second correlation information indicates an association between the first user and the plurality of third users.

3. The electronic device according to claim 1, wherein the circuitry is further configured to:
   determine, based on the received second correlation information and the GAT model, a first weight associated with each vector of a plurality of vectors, wherein
      the second set of users includes a plurality of third users,
      the plurality of vectors is associated with the plurality of third users, and
      each vector of the plurality of vectors indicates an embedding associated with a corresponding user of the plurality of third users;
   determine a plurality of weighted vectors based on the determined first weight and each vector of the plurality of vectors; and
   generate the second vector based on the determined plurality of weighted vectors.

4. The electronic device according to claim 1, wherein the circuitry is further configured to:
   determine, based on the determined first correlation information, first neighborhood information associated with the first user and associated with the first domain; and
   generate the first vector based on the determined first neighborhood information, and
   the first neighborhood information indicates users of the first set of users correlated with the first user.

5. The electronic device according to claim 1, wherein the circuitry is further configured to:
   determine, based on the received second correlation information, second neighborhood information associated with the first user and associated with the second domain;
   apply the GAT model on the determined second neighborhood information; and
   generate the second vector based on the application of the GAT model on the determined second neighborhood information, and the second neighborhood information indicates users of the second set of users correlated with the first user.

6. The electronic device according to claim 1, wherein the circuitry is further configured to:
compare the determined trust score with a specific threshold; and
determine, based on the comparison, first neighborhood information associated with the first user and associated with the first domain.

7. The electronic device according to claim 1, wherein the circuitry is further configured to:
determine a second weight associated with the second vector based on a count of the first set of users, a count of the second set of users, and a count of users common to the first set of users and the second set of users;
generate a weighted second vector based on the generated second vector and the determined second weight;
apply a recommendation model on the first vector and the weighted second vector; and
recommend the one or more items to the first user based on the application of the recommendation model.

8. The electronic device according to claim 7, wherein the circuitry is further configured to apply the recommendation model on a third vector that indicates at least one of collaborative filtering information associated with the first user, preference information associated with the first user, demographic information associated with the first user, or a purchase history associated with the first user.

9. The electronic device according to claim 1, wherein the set of domains corresponds to at least one of a set of modes or a set of application areas.

10. A method, comprising:
in an electronic device:
receiving, for each item of a first set of items associated with a first domain of a set of domains, first rating information from a first user of a first set of users;
receiving, for each item of a second set of items associated with the first domain, second rating information from a second user of the first set of users;
determining, from the first set of items and the second set of items, common items rated by each of the first user and the second user;
determining a trust score of the first user based on the first rating information associated with the common items, the second rating information associated with the common items, and a count of the second set of items, wherein
the determined trust score of the first user is a value that indicates a trust of the first user with respect to the second user;
determining first correlation information based on the determined trust score of the first user;
generating a first vector based on the determined first correlation information, wherein
the first vector indicates a first trust embedding of the first user in the first domain, and
the first trust embedding of the first user is with respect to the first set of users;
receiving second correlation information associated with a second set of users and associated with a second domain of the set of domains;
applying a Graph Attention Network (GAT) model on the received second correlation information;
generating a second vector based on the application of the GAT model, wherein
the second vector indicates a second trust embedding of the first user in the second domain, and
the second trust embedding of the first user is with respect to the second set of users;
recommending one or more items to the first user based on the first vector and the second vector; and
rendering the recommended one or more items on a display device associated with the electronic device.

11. The method according to claim 10, further comprising:
determining, based on the determined first correlation information, first neighborhood information associated with the first user and associated with the first domain; and
generating the first vector based on the determined first neighborhood information, wherein
the first neighborhood information indicates users of the first set of users correlated with the first user.

12. The method according to claim 10, further comprising:
determining, based on the received second correlation information and the GAT model, a first weight associated with each vector of a plurality of vectors, wherein
the second set of users includes a plurality of third users,
the plurality of vectors is associated with the plurality of third users, and
each vector of the plurality of vectors indicates an embedding associated with a corresponding user of the plurality of third users;
determining a plurality of weighted vectors based on the determined first weight and each vector of the plurality of vectors; and
generating the second vector based on the determined plurality of weighted vectors.

13. The method according to claim 10, further comprising:
determining, based on the received second correlation information, second neighborhood information associated with the first user and associated with the second domain;
applying the GAT model on the determined second neighborhood information; and
generating the second vector based on the application of the GAT model on the determined second neighborhood information, wherein
the second neighborhood information indicates users of the second set of users correlated with the first user.

14. The method according to claim 10, further comprising:
comparing the determined trust score with a specific threshold; and
determining, based on the comparison, first neighborhood information associated with the first user and associated with the first domain.

15. The method according to claim 10, further comprising:
determining a second weight associated with the second vector based on a count of the first set of users, a count of the second set of users, and a count of users common to the first set of users and the second set of users;
generating a weighted second vector based on the generated second vector and the determined second weight;
applying a recommendation model on the first vector and the weighted second vector; and
recommending the one or more items to the first user based on the application of the recommendation model.

16. A non-transitory computer-readable medium having stored thereon, computer-executable instructions that, when executed by an electronic device, cause the electronic device to execute operations, the operations comprising:

receiving, for each item of a first set of items associated with a first domain of a set of domains, first rating information from a first user of a first set of users;

receiving, for each item of a second set of items associated with the first domain, second rating information from a second user of the first set of users;

determining, from the first set of items and the second set of items, common items rated by each of the first user and the second user;

determining a trust score of the first user based on the first rating information associated with the common items, the second rating information associated with the common items, and a count of the second set of items, wherein the determined trust score of the first user is a value that indicates a trust of the first user with respect to the second user;

determining first correlation information based on the determined trust score of the first user;

generating a first vector based on the determined first correlation information, wherein the first vector indicates a first trust embedding of the first user in the first domain, and the first trust embedding of the first user is with respect to the first set of users;

receiving second correlation information associated with a second set of users and associated with a second domain of the set of domains;

applying a Graph Attention Network (GAT) model on the received second correlation information;

generating a second vector based on the application of the GAT model, wherein the second vector indicates a second trust embedding of the first user in the second domain, and the second trust embedding of the first user is with respect to the second set of users;

recommending one or more items to the first user based on the first vector and the second vector; and rendering the recommended one or more items on a display device associated with the electronic device.

* * * * *